United States Patent
Koskela et al.

(10) Patent No.: US 11,259,306 B2
(45) Date of Patent: Feb. 22, 2022

(54) UTILIZING INTERFERENCE MEASUREMENTS IN BEAM RECOVERY PROCEDURE

(71) Applicant: Nokia Technologies Oy, Espoo (FI)

(72) Inventors: Timo Koskela, Oulu (FI); Samuli Heikki Turtinen, Ii (FI); Jorma Johannes Kaikkonen, Oulu (FI); Sami-Jukka Hakola, Kempele (FI); Juha Pekka Karjalainen, Oulu (FI); Mihai Enescu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/960,612

(22) PCT Filed: Jan. 11, 2019

(86) PCT No.: PCT/EP2019/050707
§ 371 (c)(1),
(2) Date: Jul. 8, 2020

(87) PCT Pub. No.: WO2019/138081
PCT Pub. Date: Jul. 18, 2019

(65) Prior Publication Data
US 2020/0404559 A1   Dec. 24, 2020

Related U.S. Application Data

(60) Provisional application No. 62/616,737, filed on Jan. 12, 2018.

(51) Int. Cl.
*H04W 36/06* (2009.01)
*H04W 72/04* (2009.01)
(Continued)

(52) U.S. Cl.
CPC ..... *H04W 72/046* (2013.01); *H04W 36/0085* (2018.08); *H04W 36/06* (2013.01);
(Continued)

(58) Field of Classification Search
CPC .......... H04W 72/046; H04W 36/0085; H04W 36/06
See application file for complete search history.

(56) References Cited

U.S. PATENT DOCUMENTS

2020/0280359 A1* 9/2020 Jung .................... H04B 7/0632
2020/0374960 A1* 11/2020 Deenoo ................ H04W 72/14

FOREIGN PATENT DOCUMENTS

EP          2756606 A4     6/2015
WO     2019/138070 A1    7/2019

OTHER PUBLICATIONS

"3rd Generation Partnership Project; Technical Specification Group Radio Access Network; NR; Physical layer procedures for control (Release 15)", 3GPP TS 38.213, V15.3.0, Sep. 2018, pp. 1-101.
(Continued)

*Primary Examiner* — Michael T Vu
(74) *Attorney, Agent, or Firm* — Brake Hughes Bellermann LLP

(57) ABSTRACT

Methods, apparatuses, and computer program products where a user equipment in a wireless communications network determines a measure of signal quality for a restricted set of beam recovery candidates, compares the measure of signal quality of contention free random access candidates reference signal in the restricted set or a subset of contention free random access candidates to a signal quality based recovery threshold, and selects the at least one candidate signal with signal quality above that threshold from a candidate beam reference signal list; where the user equipment measures a reference signal received power for contention free random access candidate beam, selects candi-
(Continued)

dates above a reference signal received power threshold, determines signal quality for the selected contention free random access candidates above that threshold, and selects one candidate in response to multiple contention free random access candidates being above that threshold or the one with highest measure of signal quality.

15 Claims, 7 Drawing Sheets

(51) Int. Cl.
    *H04W 72/08*     (2009.01)
    *H04W 36/00*     (2009.01)
    *H04W 36/30*     (2009.01)
    *H04W 36/36*     (2009.01)

(52) U.S. Cl.
    CPC ......... *H04W 36/305* (2018.08); *H04W 36/36* (2013.01); *H04W 72/042* (2013.01); *H04W 72/085* (2013.01)

(56) References Cited

OTHER PUBLICATIONS

"3rd Generation Partnership Project; Technical Specification Group Radio Access Network; NR; Requirements for support of radio resource management (Release 15)", 3GPP TS 38.133, V15.3.0, Sep. 2018, pp. 1-136.
"3rd Generation Partnership Project; Technical Specification Group Radio Access Network; NR; Physical layer procedures for data (Release 15)", 3GPP TS 38.214, V15.3.0, Sep. 2018, pp. 1-96.
"3rd Generation Partnership Project; Technical Specification Group Radio Access Network; NR; Medium Access Control (MAC) protocol specification (Release 15)", 3GPP TS 38.321, V15.3.0, Sep. 2018, pp. 1-76.
"3rd Generation Partnership Project; Technical Specification Group Radio Access Network; NR; Physical layer measurements (Release 15)", 3GPP TS 38.215, V15.3.0, Sep. 2018, pp. 1-15.
"3rd Generation Partnership Project; Technical Specification Group Radio Access Network; NR; Radio Resource Control (RRC) protocol specification (Release 15)", 3GPP TS 38.331, V15.3.0, Sep. 2018, pp. 1-445.
International Search Report and Written Opinion received for corresponding Patent Cooperation Treaty Application No. PCT/EP2019/050707, dated Apr. 11, 2019, 17 pages.
"LS to RAN2 on Beam Failure Recovery", 3GPP TSG RAN WG2#AH-1801, R2-1800003, RAN1, Jan. 22-26, 2018, 3 pages.
"Basic beam recovery", 3GPP TSG RAN WG1 Meeting 90bis, R1-1718434, Agenda : 7.2.2.4, Ericsson, Oct. 9-13, 2017, 8 pages.
"Remaining issues on beam recovery", 3GPP TSG RAN WG1 Meeting #91, R1-1720631, Agenda : 7 2.2.4, InterDigital, Inc., Nov. 27-Dec. 1, 2017, 6 pages.
"Issues/Corrections: Beam Failure Recovery Request Procedure", 3GPP TSG-RAN2 AH-1801, R2-1800086, Agenda : 10.3.1.4.2, Samsung, Jan. 22-26, 2018, 3 pages.
"On Beam Management, Measurement and Reporting", 3GPP TSG RAN WG1 Meeting 90bis, R1-1717605, Agenda : 7.2.2 3, Samsung, Oct. 9-13, 2017, 16 pages.
"Summary from offline for beam recovery mechanism", 3GPP TSG RAN WGI 1 Meeting #89, R1-1709606, Agenda : 7.1.2.2.2, MediaTek, May 15-17, 2017, 8 pages.
First Examiner Report for Indian Application No. 202047034289, dated Nov. 16, 2021, 5 pages.
3GPP TSG RAN WG2#AH-1801; R2-1800003; "LS to RAN2 on Beam Failure Recovery", Release: Rel-15 Work Item: NR_newRAT-Core; Vancouver, Canada; Jan. 22-26, 2018; 3 pages.

\* cited by examiner

| TCI index | Source RS set | Source RS index | QCL type |
|---|---|---|---|
| 0 | RS set #A | SS/PBCH block #n (of set #A) | A+D |
| 1 | RS set #B | TRS #b (of set (#B) | A |
| | | CSI-RS #c (of set #B) | D |
| ... | ... | ... | ... |
| M-1 | RS set #E | CSI-RS #b (of the set #E) | A+D |

402
UE is configured with: a TCI table to indicate source RSs for different QCL parameters; one or more CORESETs for NR-POCCH reception; multiple TCI states (multiple transmit beams) associated with a CORESET; a TCI state that is active for the CORESET the BFRQ resource associated with one or multiple TCI states associated with a CORESETs

404
UE determines a beam failure and detects a replacement candidate beam

406
In response to the replacement candidate beam being associated with a TCI state associated with a CORESET, the UE triggers a BFRQ resource transmission associated with the replacement candidate beam

408
The UE monitors the CORESET of the DL RS associated with the replacement candidate beam via TCI linkage for PDCCH to receive a response to BFRQ

602
A user equipment, in a wireless communications network, determines a measure of signal quality for a restricted set of beam recovery candidates

604
The UE compares the measure of signal quality of contention free random access candidates reference signal in the restricted set of beam recovery candidates or a subset of contention free random access candidates to a signal quality based recovery threshold

606
The UE selects the at least one candidate signal with signal quality above the signal quality based recovery threshold from a candidate beam reference signal list

FIG. 6

UTILIZING INTERFERENCE MEASUREMENTS IN BEAM RECOVERY PROCEDURE

RELATED APPLICATION

This application claims priority to PCT Application No. PCT/EP2019/050707, filed on Jan. 11, 2019, which claims priority to U.S. Provisional Application No. 62/616,737, filed on Jan. 12, 2018, each of which is incorporated herein by reference in its entirety.

TECHNICAL FIELD

This invention relates generally to 3GPP New Radio (NR) physical layer design and, more specifically, relates to enhancements of beam failure recovery procedure by utilizing interference measurements.

Beam failure recovery is a mechanism introduced in Rel-15 to handle (frequent) transmit and receive beam misalignment between gNB and UE, since a beam-based system is sensitive to blockages, UE rotation, and mobility. Beam misalignment happens when TX and RX beam pair(s) for the PDCCH get mismatched. Relying on radio link failure (RLF), as used in LTE, would result in high latency. In contrast, the beam failure recovery mechanism disclosed herein recovers beam(s) for the PDCCH with lower latency than would be possible based on RLF.

This invention also relates generally to beam management and recovery procedures and, in particular, 3GPP New Radio (NR) physical layer design, focusing on beam recovery procedures and how control resource set (CORESET) and Quasi-co-location (QCL) associations are determined by gNB and UE

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

A UE can be configured with up to 3 CORESETs and together 10 search space sets within a configured bandwidth part (BWP). CORESET defines physical time and frequency resources on which NR-PDCCH (Physical Downlink Control Channel) can be transmitted. Search space set defines PDCCH monitoring related time domain parameters such as monitoring periodicity: In other words, search space parameters provide a UE with information when trying to detect NR-PDCCH from a certain CORESET.

A QCL framework is used for defining a "transmit beam" for different downlink physical signals and channels such as those for periodic, semi-persistent, and aperiodic CSI-RS, NR-PDCCH, and NR-PDSCH (Physical Downlink Shared Channel). As such, a UE is configured with a transmission configuration indication (TCI) table in which each row/state is associated with one or two reference signals (RSs) that act as a source RS(s) in terms of different QCL parameters (e.g., delay spread, average delay, doppler spread, doppler shift, spatial RX) for the certain downlink signal. When a spatial RX QCL parameter is to be configured for the certain source RS, the UE can assume the same RX beam (or RX spatial filter) can be applied when receiving a target physical signal or physical channel as was used for receiving the source RS. Source RS may be e.g. SS/PBCH Block (Synchronization signal/Physical Broadcast Channel), CSI-RS, TRS (tracking reference signal), DMRS (demodulation reference signal) or the like. SS/PBCH block consists of PSS, SSS (Primary, Secondary SS) and symbols carrying PBCH, including PBCH DMRS and has total length of 4 symbols. Invention is not limited to the potential alternative transmission methods of SS/PBCH block in time or frequency domain (in other words, for instance, instead of sending 4 symbols, if the SS block components may be transmitted in frequency domain, for example, using only one symbol, that would satisfy this aspect).

For determining the transmit beam for the NR-PDCCH, it has previously been agreed that each CORESET may be associated to one or multiple above mentioned TCI rows (or TCI states). In cases where the CORESET is associated with more than one TCI states, MAC-CE level activation signaling is used to control that which one of the multiple TCI states is active at a time per CORESET. UE may be configured with multiple CORESETs Search space set related parameters associated to the CORESET define time domain monitoring pattern from which the UE knows when to monitor certain CORESET; then, from associated (active) TCI state of the CORESET, the UE knows how to set its RX beam.

FIG. 1 provides an exemplary TCI table configured for the UE where QCL type A means Doppler spread, Doppler shift, delay spread, average delay and QCL type D means spatial RX. Thus, when TCI index 0 determines source RS(s) for a certain physical signal or channel, the UE can determine that it can set its RX beam as it was set for receiving the SS/PBCH block #n. Correspondingly, when TCI index 1 determines source RS(s) for a certain physical signal or channel, the UE can determine that it can set its RX beam as it was set for receiving the CSI-RS # (of RS set #B).

FIG. 2 illustrates the case that UE has been configured two CORESETs with one or multiple TCI state associations. For the CORESET #0, MAC-CE signaling is used to activate one TCI state at a time.

It has been further previously agreed that for beam recovery procedure the UE can be configured with a dedicated CORESET for monitoring gNB response for the beam failure recovery request (BFRQ, sometimes abbreviated as BFRR). This is referred as CORESET-BFR (Beam Failure Recovery) herein after. Based on the agreement in RAN1 #90bis, the UE assumes that the CORESET-BFR is spatially QCL'd with DL RS of the UE identified (and indicated) candidate beam by the beam failure recovery request. In other words, the UE indicates candidate beam (or candidate downlink RS) using an uplink preamble signal that is associated with it.

In RAN1 #91 it was agreed that only periodic CSI-RS or SSB which is spatially QCL'd with PDCCH DMRS is used for beam failure detection. The monitored BFD (beam failure detection) resources (among the possible periodic RS configured to be QCL'd with PDCCH) can be specifically configured for RS for beam failure detection. If not configured, then by default the UE assumes for beam failure detection that at least one of SSB or periodic CSI-RS is QCL'd with the PDCCH DMRS.

For recovery purposes, when a UE has declared beam failure, the network can configure the UE with contention free resources from the PRACH resource pool. Contention free resources can be associated with SSBs or CSI-RS. The RS in the list are referred as candidate beams and indicated by a Candidate-beam-RS-list. To indicate a candidate, if both CSI-RS and SSB are listed but only SSBs are associated with dedicated recovery preamble resources, then the recovery to CSI-RS candidate is done via QCL association to the SSB.

To declare beam failure, the quality of downlink RS used for beam failure detection has to be below a specific quality threshold for N (or N-consecutive) beam failure monitoring instances (done periodically). Currently failure is agreed to be done based on hypothetical PDCCH BLER, determined from beam failure RS. In the case where multiple RS are used (e.g., if UE has multiple PDCCH links or NW has configured multiple beam failure RS), then the quality of all RS need to be below the quality threshold for number of beam failure instances to declare failure. Alternative, N-consecutive failure instances may be needed to declare failure.

Limitations of these previously agreed to proposals include the fact that currently DL RSs associated to active TCI states configured for the CORESET are evaluated for beam failure detection and when UE declares beam failure (all the active TCI states are considered to be in failure condition so that beam failure can be declared) and transmits BFRQ it is monitoring the CORESET-BFR for gNB response. In discussions regarding NR, which seems suboptimal in certain cases. The current limitation of state of the art is that when UE indicates recovery (regardless of which DL RS is indicated as new candidate by a dedicated recovery signal) it is required to monitor CORESET-BFR. Thus, the current invention moves beyond the current techniques and/or materials.

The components of the Rel-15 beam failure recovery procedure, which are discussed hereinbelow, involve a beam failure detection Reference Signal (RS) list, declaring beam failure, candidate RS (beam) list, and beam failure recovery request.

Regarding the beam failure detection Reference Signal (RS) list, a Network configures a UE with set of reference signals for monitoring the quality of the link. This set can be referred as q0 or Beam Failure Detection Reference Signal (BFD-RS). Typically, BFD-RS(s) are configured to be spatially Quasi Co-Located (QCL'd) with PDCCH Demodulation Reference Signal (DMRS), such that these reference signals correspond to downlink beams used to transmit PDCCH for the UE. Downlink Beams are identified by reference signal, either SS/PBCH block (time location) index or CSI-RS resource index. The network can configure the BFD-RS list using RRC signaling or it can configure the list with combined RRC+MAC Control Element (CE) signaling.

When a UE is not explicitly configured with the BFD-RS list, it then determines the BFD-RS resources implicitly based on the configured/indicated/activated PDCCH-TCI states per CORESET, such that the downlink reference signals (CSI-RS, SS/PBCH block) that are spatially QCL'd with PDCCH DMRS, or in other words, PDCCH beams.

Next comes declaring beam failure. The physical layer assesses the quality of the radio link (based on BFD-RS in set of q0) periodically. Assessment is done per BFD-RS and when the radio link condition of each BFD-RS in the beam failure detection set is considered to be in failure condition, such that the hypothetical PDCCH BLER, estimated using the RS, is above the configured threshold, and a beam failure instance (BFI) indication is provided to higher layer (MAC). An example of BLER threshold value may be the out of sync threshold used for radio link monitoring $OOS/Q_{out}=10\%$. Evaluation and potential indication is done periodically.

If the at least one BFD-RS is not in failure condition, then no indication is provided to higher layer. The MAC layer implements a counter to count the BFI indications from the PHY layer and if the BFI counter reaches maximum value (configured by the network) a beam failure is declared. This counter can be configured to be supervised by a timer, for instance, each time MAC receives BFI indication from lower layer then a timer is started. Once the timer expires, the BFI counter is reset (counter value is set to zero).

Regarding a candidate RS (beam) list, the Network can provide the UE with a list of candidate RSs for new beam identification that can be indicated using dedicated signal. Candidate beam L1-RSRP measurements can be provided to the MAC layer which performs the selection of new candidate and determines the uplink resources to indicate the new candidate to network. The network can configure the UE with dedicated signaling resources (PRACH resources) that are candidate beam specific, such that the UE can indicate new candidate by sending a preamble.

Finally, a beam failure recovery procedure is initiated if the UE declares beam failure and detects a new candidate beam or beams based on L1 measurements (e.g. L1-RSRP). A dedicated signal (CFRA, contention free preamble) corresponding to a specific RS (SSB or CSI-RS) can be configured for each candidate RS in the Candidate-Beam-RS-List (referred as set of q1). Dedicated signal can be used, in addition to indicate beam failure, to indicate new candidate beam to gNB. A specific threshold can be configured so that if any of the candidates in set q1 (based on L1-RSRP measurements) are above the threshold, they can be indicated using dedicated signal (set of resources in set q1). UE selects candidate beam from that set and in case there are no q1 candidate beams above the configured threshold, UE utilizes contention-based RACH procedure to indicate new candidate to network. Contention Based Random Access (CBRA) preamble resources are mapped to specific downlink RS (such as SSB).

CFRA for beam recovery procedure differs slightly from Contention Free Random Access (CFRA) procedure in terms of gNB response to UE preamble transmission. The UE monitors the network response to Beam Failure Recovery Request (BFRR) during the beam recovery response window (similar to RACH Response window) using the same beam alignment (such that the same beam direction that was used for TX is used for RX) used for transmitting the recovery signal. The UE expects network to provide a response using a beam that is spatially QCL'd with the indicated downlink reference signal. When CFRA is used for beam recovery purposes, then the UE expects network to respond using C-RNTI instead of RA-RNTI. In case CBRA resources are used, UE expects response (and further message exchange) as normally in contention based RACH procedure [3].

The use of CFRA preambles for candidate indication, if configured, is supervised by a beamFailureRecoveryTimer. When configured, and when the timer is running, a UE can use CFRA signaling for candidate indication (if the candidates are suitable). When the timer has expired, then UE shall not use CFRA candidates for beam failure recovery.

Note that Beam Management enhancements such as L1-SINR are specified in new work item "Enhancements on MIMO for NR" which was approved in RAN #80 that aims to specify the enhancements identified for NR MIMO. The detailed objectives include extending specification support in the following areas [RAN1] such as enhancements on multi-beam operation, primarily targeting FR2 operation: to perform study and, if needed, specify enhancement(s) on UL and/or DL transmit beam selection specified in Rel-15 to reduce latency and overhead; to specify UL transmit beam selection for multi-panel operation that facilitates panel-specific beam selection; to specify a beam failure recovery for SCell based on the beam failure recovery specified in Rel-15, and to specify measurement and reporting of either L1-RSRQ or L1-SINR.

Following aspects have been discussed at the present time of the invention regarding L1-SINR: In RAN1-94bis meeting, it was agreed that L1-SINR is supported for beam reporting in Rel-16. Furthermore, it was agreed that different options for the content of beam reporting, e.g. CSI-RS resource indicator (CRI) or synchronization signal block needs to be further studied. Furthermore differential and group-based reporting as well as interference measurement mechanisms needs to be also further studied.

In RAN1-95 meeting, it was agreed that UE performs L1-SINR measurements for intended signal part based on SSB and/or NZP-CSI-RS resources. However, it remained open what kind of resources needs to be associated with interference part computation at UE-side. According to discussions in RAN1-#95, it can be assumed that SS-SINR and CSI-RS-SINR measurements specified in Rel-15 TS 38.215 CSI-RS and SSB resources defined for SS-SINR as well as CSI-SINR based L1-SINR computation can be used as a baseline for interference computation Rel-15 L1-SINR computation.

It should be understood that the methods described in the invention are not limited above examples on SINR calculation and SINR used for candidate beam selection.

At the time of the present invention, link recovery procedures are stated in 38.213—6 Link Recovery Procedures as follows:

The thresholds $Q_{out,LR}$ and $Q_{in,LR}$ correspond to the default value of higher layer parameter rlmInSyncOutOfSyncThreshold, as described in [10, TS38.133] for $Q_{out}$, and to the value provided by higher layer parameter rsrp-ThresholdSSB, respectively. The physical layer in the UE assesses the radio link quality according to the set $\bar{q}_0$ of resource configurations against the threshold $Q_{out,LR}$. For the set $\bar{q}_0$, the UE assesses the radio link quality only according to periodic CSI-RS resource configurations or SS/PBCH blocks that are quasi co-located, as described in [6, TS 38.214], with the DM-RS of PDCCH receptions monitored by the UE. The UE applies the $Q_{in,LR}$ threshold to the L1-RSRP measurement obtained from a SS/PBCH block. The UE applies the $Q_{in,LR}$ threshold to the L1-RSRP measurement obtained for a CSI-RS resource after scaling a respective CSI-RS reception power with a value provided by higher layer parameter powerControlOffsetSS.

The current invention moves beyond the current techniques and/or materials

Abbreviations that may be found in the specification and/or the drawing figures are defined below, at the beginning of the detailed description section.

2G Second Generation
3G Third Generation
3GPP Third Generation Partnership Project
5G Fifth Generation
5G-NB Fifth Generation Node B
BFR Beam Failure Recovery
BFRQ Beam Failure Recovery Request
BLER Block Error Ratio
BS Base Station
BSI Beam State Information
BRI Beam Refinement Information
BRRS Beam Refinement Reference Signal
CCE Control Channel Element
CE Control Element
CBRA Contention Based Random Access
CFRA Contention Free Random Access
CORESET Control Resource Set
C-RNTI Cell Radio Network Temporary Identifier
CSI Channel State Information
CSI-RS Channel State Information Reference Signal
CU Central Unit
CU-UP Central Unit User Plane
DL Downlink
DMRS Demodulation Reference Signal
DU Distributed Unit
eNB or eNodeB Evolved Node B (LTE base station)
EN-DC E-UTRA-NR dual connectivity
en-gNB or En-gNB node providing NR user plane and control plane protocol terminations towards the UE, and acting as secondary node in EN-DC
E-UTRA evolved Universal Terrestrial Radio Access, i.e., the LTE radio access technology
gNB NR/5G Node B
I/F Interface
LTE Long Term Evolution
NB NodeB, base station
MAC Medium Access Control
MAC-CE Medium Access Control-Control Element
MME Mobility Management Entity
NCE Network Control Element
ng or NG New Generation
ng-eNB or NG-eNB new generation eNB
NR New Radio
N/W or NW Network
PDCP Packet Data Convergence Protocol
PDCCH Physical Downlink Control Channel
PHY Physical Layer
PUCCH Physical Uplink Control Channel
PUSCH Physical Uplink Shared Channel
QCL Quasi Co-location
RA Random Access
RAN Radio Access Network
Rel Release
ReTx Retransmission or retransmitting
RLC Radio Link Control
RLM Radio Link Monitoring
RRC Radio Resource Control
RRH Remote Radio Head
RS Reference Signal
RSRP Reference Signal Received Power
RSRQ Reference Signal Received Quality
RU Radio Unit
Rx, RX Reception or receiving
SDAP Service Data Adaptation Protocol
SGW Serving Gateway
SMF Session Management Function
SINR Signal to Interference and Noise Ratio
SR Scheduling Request
SSB SS/PBCH Block
SS/PBCH Synchronization Signal/Physical Broadcast Channel
SS-RSRP Synchronization Signal Reference Signal Received Power
TCI Transmission Configuration Indication
TS Technical Specification or Technical Standard
Tx, TX Transmission or transmitting
TXRU Transceiver Unit
UE User Equipment or mobile station
UL Uplink
UPF User Plane Function

BRIEF SUMMARY

An example of an embodiment is a method comprising: determining, by a user equipment in a wireless communications network, a measure of signal quality for a restricted set of beam recovery candidates; comparing the measure of signal quality of contention free random access candidates reference signal in the restricted set of beam recovery candidates or a subset of contention free random access candidates to a signal quality based recovery threshold; selecting the at least one candidate signal with signal quality above the signal quality based recovery threshold from a candidate beam reference signal list.

An example of a further embodiment is a method comprising: measuring, by an user equipment in a wireless communications network, a reference signal received power for contention free random access candidate beams; selecting candidates above a reference signal received power threshold; determining signal quality for the selected contention free random access candidates above the reference signal received power threshold; in response to multiple contention free random access candidates being above the signal quality based recovery threshold, selecting one of the candidates, or selecting the candidate with highest measure of signal quality among candidates above a signal quality based recovery threshold.

An example of another embodiment is an apparatus comprising: at least one processor; and at least one memory including computer program code, wherein the at least one memory and the computer program code are configured, with the at least one processor, to cause the apparatus to perform at least the following: determining, by a user equipment in a wireless communications network, a measure of signal quality for a restricted set of beam recovery candidates; comparing the measure of signal quality of contention free random access candidates reference signal in the restricted set of beam recovery candidates or a subset of contention free random access candidates to a signal quality based recovery threshold; selecting the at least one candidate signal with signal quality above the signal quality based recovery threshold from a candidate beam reference signal list.

An example of yet another embodiment is an apparatus comprising: at least one processor; and at least one memory including computer program code, wherein the at least one memory and the computer program code are configured, with the at least one processor, to cause the apparatus to perform at least the following: measuring, by an user equipment in a wireless communications network, a reference signal received power for contention free random access candidate beams; selecting candidates above a reference signal received power threshold; determining signal quality for the selected contention free random access candidates above the reference signal received power threshold; in response to multiple contention free random access candidates being above the signal quality based recovery threshold, selecting one of the candidates, or selecting the candidate with highest measure of signal quality among candidates above a signal quality based recovery threshold.

An example of an additional embodiment is an apparatus comprising: means for determining, by a user equipment in a wireless communications network, a measure of signal quality for a restricted set of beam recovery candidates; means for comparing the measure of signal quality of contention free random access candidates reference signal in the restricted set of beam recovery candidates or a subset of contention free random access candidates to a signal quality based recovery threshold; means for selecting the at least one candidate signal with signal quality above the signal quality based recovery threshold from a candidate beam reference signal list.

An example of still an additional embodiment is an apparatus comprising: means for measuring, by an user equipment in a wireless communications network, a reference signal received power for contention free random access candidate beams; means for selecting candidates above a reference signal received power threshold; means for determining signal quality for the selected contention free random access candidates above the reference signal received power threshold; means for selecting, in response to multiple contention free random access candidates being above the signal quality based recovery threshold, selecting one of the candidates, or selecting the candidate with highest measure of signal quality among candidates above a signal quality based recovery threshold.

An example of another embodiment is a computer program product comprising a computer-readable medium bearing the computer program code embodied therein for use with a computer, the computer program code comprising code to control or perform at least the following: determining, by a user equipment in a wireless communications network, a measure of signal quality for a restricted set of beam recovery candidates; comparing the measure of signal quality of contention free random access candidates reference signal in the restricted set of beam recovery candidates or a subset of contention free random access candidates to a signal quality based recovery threshold; selecting the at least one candidate signal with signal quality above the signal quality based recovery threshold from a candidate beam reference signal list.

An example of yet another embodiment is a computer program product comprising a computer-readable medium bearing the computer program code embodied therein for use with a computer, the computer program code comprising code to control or perform at least the following: measuring, by an user equipment in a wireless communications network, a reference signal received power for contention free random access candidate beams; selecting candidates above a reference signal received power threshold; determining signal quality for the selected contention free random access candidates above the reference signal received power threshold; selecting, in response to multiple contention free random access candidates being above the signal quality based recovery threshold, selecting one of the candidates, or selecting the candidate with highest measure of signal quality among candidates above a signal quality based recovery threshold.

This section is intended to include examples and is not intended to be limiting.

BRIEF DESCRIPTION OF THE DRAWINGS

In the attached Drawing Figures:

FIG. 1 is TCI table configured for the UE;

FIG. 4 is a logic flow diagram of an exemplary method for CORESET and QCL association in beam recovery procedure, a result of execution of computer program instructions embodied on a computer readable memory, functions performed by logic implemented in hardware, and/or interconnected means for performing functions in accordance with exemplary embodiments;

FIG. 6 is a logic flow diagram of an exemplary method for utilizing interference measurements in beam recovery procedure, and illustrates the operation of an exemplary method or methods, a result of execution of computer program instructions embodied on a computer readable memory, functions performed by logic implemented in hardware, and/or interconnected means for performing functions in accordance with exemplary embodiments.

DETAILED DESCRIPTION OF THE DRAWINGS

Figure 2:
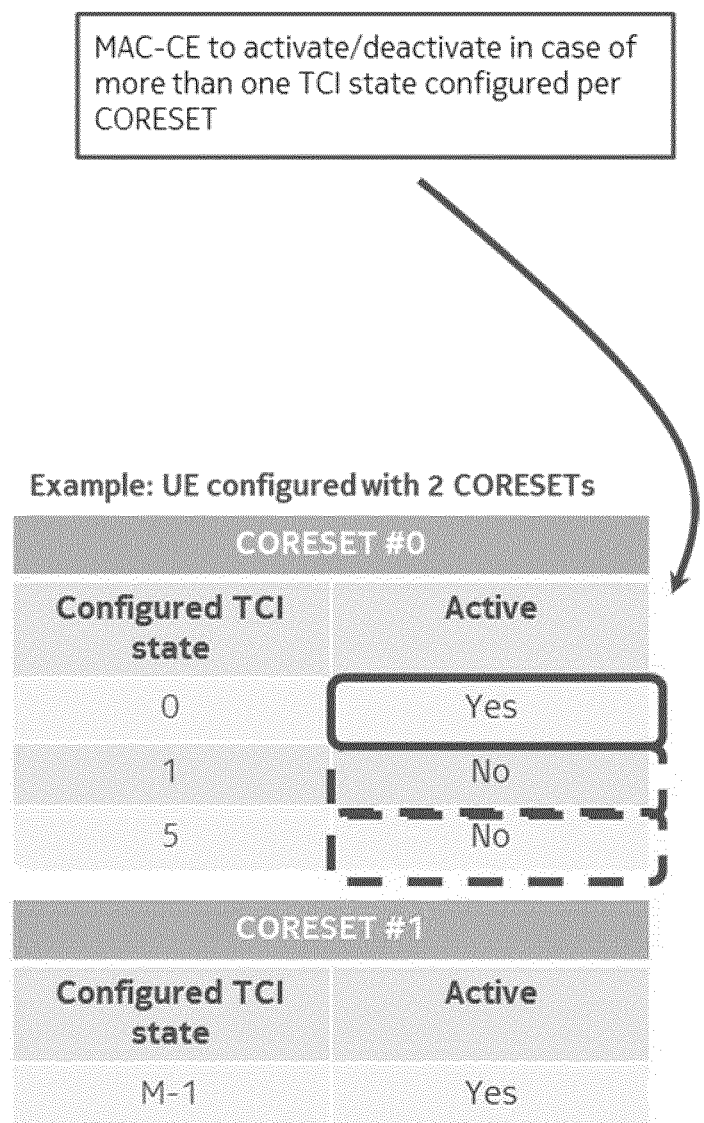
FIG. 2 is a schematic of a UE configured with two CORESETs with one or multiple TCI state associations.

Please note that examples and embodiments discussed herein are not intended to be limiting. Moreover, the word "exemplary" as used herein means "serving as an example, instance, or illustration." Thus, any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The current Application discloses beam recovery procedures including control resource set (CORESET) and quasi co-location (QCL) association.

As discussed above, a problem that arises based on current agreements is that all (periodic) DL RSs associated to active TCI states configured for the CORESET are evaluated for beam failure detection. In addition, currently a UE monitors only dedicated CORESET-BFR for beam failure when it has indicated new candidate to gNB via dedicated preamble.

For instance, TS38.213 appears to consider an embodiment when Beam-Failure-Detection-RS-ResourceConfig is not configured by higher layer, and higher layer parameter TCI-StatesPDCCH defines TCI state for RS resource sets for beam recovery. The TS 38.213 says "A UE is configured with one control resource set by higher layer parameter Beam-failure-Recovery-Response-CORESET. A UE can be configured, for a serving cell, with a set of periodic CSI-RS resource configuration indexes by higher layer parameter Beam-Failure-Detection-RS-ResourceConfig and with a set of CSI-RS resource configuration indexes and/or SS/PBCH block indexes by higher layer parameter Candidate-Beam-RS-List for radio link quality measurements on the serving cell. If the UE is not provided with higher layer parameter Beam-Failure-Detection-RS-ResourceConfig, the UE determines to include SS/PBCH blocks and periodic CSI-RS configurations with same values for higher layer parameter TCI-StatesPDCCH as for control resource sets that the UE is configured for monitoring PDCCH as described in Sub-clause 10.1".

However, it seems that when a UE is not configured separately for the failure detection RS, there is implicit configuration of PDCCH beam(s) (TCI state/states that are active) as beam failure detection RS. In this case, with the method in the invention, when a UE performs beam recovery for an inactive TCI state, it would not need to monitor (and gNB does not need to transmit) the CORESET-BFR Prior to this invention, when transmitting recovery using dedicated signals, a UE monitors CORESET-BFR for gNB response. For recovery using dedicated resources, the UE monitors for DL transmission with its C-RNTI, when detected the failure recovery can be considered to be successful. The current invention proposes that when a UE transmits recovery request indicating a candidate beam that is configured as TCI state but is not active (the UE does not monitor PDCCH on inactive TCI states), it will monitor the CORESET corresponding to that TCI state instead of CORESET-BFR. The method of this invention can also be extended to cover beam recovery using dedicated random access signals (contention free random access). Although for beam recovery the dedicated signals may be configured from PRACH signal space, the procedure may differ (whether it is a beam recovery procedure or random access procedure. In random access gNB responds UE with a message using RA-RNTI and using CORESET configured for monitoring RAR (random access response). Also in this case when UE performs recovery to a TCI state associated with current CORESET for PDCCH reception, UE would not be monitoring RAR response but instead monitoring gNB response (with its C-RNTI) on the CORESET associated with indicated TCI state. In one alternative network may transmit RAR as a response to dedicated RA preamble using C-RNTI.

As an additional aspect of the invention, since the indicated TCI state may be associated to multiple CORESETs, UE needs to potentially monitor all the associated CORESETs for gNB recovery response. UE monitors gNB response for the configured time duration of ResponseWindowSize-BFR (an example of a name). Duration may be expressed as millisecond, symbols or slot (set of symbols), subframes etc. In case the TCI indicated by UE is associated with multiple CORESETs, the following rules could be used to determine whether UE monitors all the CORESETs, subset of CORESET, or only one, as the following alternatives show:

i. Alt1. UE monitors all CORESET during the response window
ii. Alt2. UE monitors CORESET with smaller ID
iii. Alt3. UE monitors CORESET which is considered to be a default CORESET (could be indicated by network or fixed to be the lowest/highest CORESET ID
iv. Alt4. UE monitors CORESET that has associated search space set with higher maximum CCE aggregation level
v. Alt5. In case the CORESETs are transmitted with specific time domain pattern, UE monitors the CORESET according to the pattern during the recovery response window In the situation where there are potential candidate beams (DL RS) that are above a quality threshold in the TCI state configured for the CORESET but are not currently active, it would be suboptimal to switch the recovery monitoring to another CORESET. In other words, the default CORESET configuration for monitoring beam failure recovery response is typically configured with a larger set of PRBs to allow use of a higher aggregation level (e.g., to compensate for the loss of dedicated beam), using more of the system capacity. Furthermore, alignment of an additional CORESET with other CORESETs may not be optimal which may lead to poorer CORESET resource utilization or higher PDCCH blockading e.g. which would limit the gNB scheduling flexibility.

In one additional aspect of the invention, when selecting candidate beams for beam recovery, the UE can prioritize candidate beams that are configured as TCI states (but are not active and are above the candidate beam selection threshold) over the other candidate beams. If multiple inactive TCI states are above the candidate beam threshold and can be indicated using dedicated beam recovery resource UE can select TCI state with highest signal quality in terms of hypothetical PDCCH BLER, RSRP, RSRQ or the like. In one aspect it can be beneficial for the UE to select TCI that has the hypothetical PDCCH BLER below Qin/IS (in-sync threshold) threshold used in radio link monitoring procedure (RLM) instead of basing the selection on merely RSRP measurement as the RSRP measurement does not take into account the interference. As an example, the RSRP measurement can be done on SS block signals, CSI-RS or on a combination of SS block and CSI-RS signals. As beam failure detection can be based on the same reference signals and hypothetical PDCCH BLER threshold values (Qout/OOS (out-of-sync)) as used for radio link monitoring, it can be likely that radio link problem is detected by RRC layer causing it to start radio link recovery timer T310. This timer can be stopped by counting number of IS indications at RRC, indicated by L1 when the radio link is determined to be in IS condition (the hypothetical PDCCH BLER is below threshold). In case the T310 expires i.e. the radio link is not considered to be in IS condition it will cause RRC to declare radio link failure (RLF). Example values for IS/OOS are e.g. 2% for IS and 10% for OOS (other values are not excluded and can be configured by network. Thus, selecting TCI for recovery that is in IS condition from RLM perspective can prevent the RLF. Alternatively, the UE could select TCI with lowest measured BLER on potentially detected candidate beams. Candidate selection can therefore be done in 2 stages i.e. first based on RSRP and then select candidate in IS condition from RLM perspective or select the candidate based on lowest measured hypothetical PDCCH BLER. Naturally the alternative would be to consider only BLER. In more general view and in one further example, the UE can prefer to perform recovery to candidate beam (DL RS) with IS condition regardless whether the candidate is a configured TCI state. The UE may need to indicate then the recovery using contention based mechanism such as contention based random access. Furthermore, as a response to beam recovery failure request gNB can request UE to report N-highest quality beams (downlink RS such as SS block and/or CSI-RS). Report can consist of beam/downlink RS identifier and additionally the quality level such as RSRP. In one additional example the UE can be required to report beams with hypothetical PDCCH BLER below the aforementioned IS threshold (e.g. 2%). This would allow gNB to configure new TCI states or indicate an inactive TCI state to be active.

Proposed herein is a CORESET beam recovery procedure, where a downlink reference signal (DL RS) corresponding to a transmission configuration indication (TCI) state activated for certain CORESET is determined as beam failure detection resource. Also proposed is the QCL association beam recovery procedure, where a UE can transmit UL request signal to require switching an active TCI state of the CORESET to a currently deactivated TCI state of the same CORESET. In principle, a condition or rule based UE initiated change of active TCI state is proposed.

The proposed operation would be that UE monitors from all configured CORESETs the active TCI state (or states) DL RS for determining the beam failure. If all active TCIs associated with one or multiple CORESETs are in failure condition, then UE looks also to DL RS of nonactive TCI states of these CORESETs. If non-active TCI state DL RS are alive (i.e. the signal quality in terms of RSRP, RSRQ SINR, hypothetical PDCCH BLER etc. is considered to be good), then the UE initializes beam failure recovery request (BFRQ) using the configured contention free random access resources configured for beam failure recovery corresponding to that TCI state. Then, then UE monitors for BRFQ response on CORESET associated with the indicated TCI state (indicated by BRFQ preamble), instead of on the dedicated CORESET or default CORESET for beam failure recovery.

Specifically, in a first incarnation of the present invention, it is proposed that DL RS corresponding to a TCI state activated (by means of MAC-CE) for a certain CORESET is determined as beam failure detection resource. Other DL RSs associated to TCI states configured for the CORESET may be configured to be associated to dedicated UL signal (PRACH resources for beam failure recovery) for beam failure recovery request. Then, if the UE triggers beam recovery procedure using a dedicated UL signal associated to DL RS corresponding to a TCI state configured in a deactivated state for the certain CORESET, the UE will remain monitoring response from the gNB using the CORESET associated (through the TCI) with the DL RS instead of dedicated beam recovery CORESET(-BFR). A method similar to that of this invention may also be used when performing recovery using RA procedure with CFRA resource. Both beam failure recovery and contention free random access resources may be configured from same the pool of PRACH resource but actual procedure may differ. Alternatively, or additionally the contention free signals may be configured from a preamble resource pool that can be used to transmit preamble signal when UE is in uplink-synchronized state i.e. UE has obtained Timing Advance and thus the signaling resource pool may have more preambles since the preamble signal does not have to take into account the timing uncertainty of an uplink transmission. Such signals are for example scheduling request (SR) as in LTE.

In another incarnation, a fast NR-PDCCH beam switch procedure is proposed, where the UE may transmit UL request signal to require switching an active TCI state of the CORESET to a currently deactivated TCI state of the same CORESET. In other words, the gNB may configure, similar to above, the UL BFRQ resources associated with deactivated TCI states of the certain CORESET. When the UE transmits BRFQ signal associated to the certain TCI state of the CORESET, then the UE implicitly assumes that the TCI state as active in the CORESET and the UE tries to detect PDCCH, confirming the switch from the CORESET assuming the requested new active TCI state. There may a certain window defined/configured for how long a UE can assume a response from the gNB for the beam switch request. The gNB may confirm the switch by scheduling DL/UL grant using C-RNTI or in an explicit TCI state configuration message (MAC CE/DCI). In case a TCI state is associated with multiple CORESETS, similar rules may be applied as described for beam recovery.

This whole functionality may be configurable per CORESET, whether the UE may request switching active TCI state per CORESET or not.

When UE has declared a beam failure of an active TCI state for a specific CORESET, it can indicate the switch to an inactive TCI state in the same CORESET as being considered as recovery from a special case, as a failure of subset of control links, or as a partial beam failure. There may be further rules defined for fast switching, for instance, if the quality of inactive TCI state (measured using corresponding DL RS) becomes offset better (quality of inactive TCI state becomes is higher than quality of an active TCI state+offset value) than current active TCI state (where the offset value may be positive, negative or zero). Quality in this case may refer to RSRP, RSRQ, hypothetical PDCCH BLER, SINR, etc. of the DL RS/TCI state.

For the "not" situation, the UE would follow beam recovery related procedures for the CORESET. In other words, for the CORESETs for which a "fast NR-PDCCH beam switch request" procedure is disabled, the UE follows beam recovery procedure.

Figure 3:
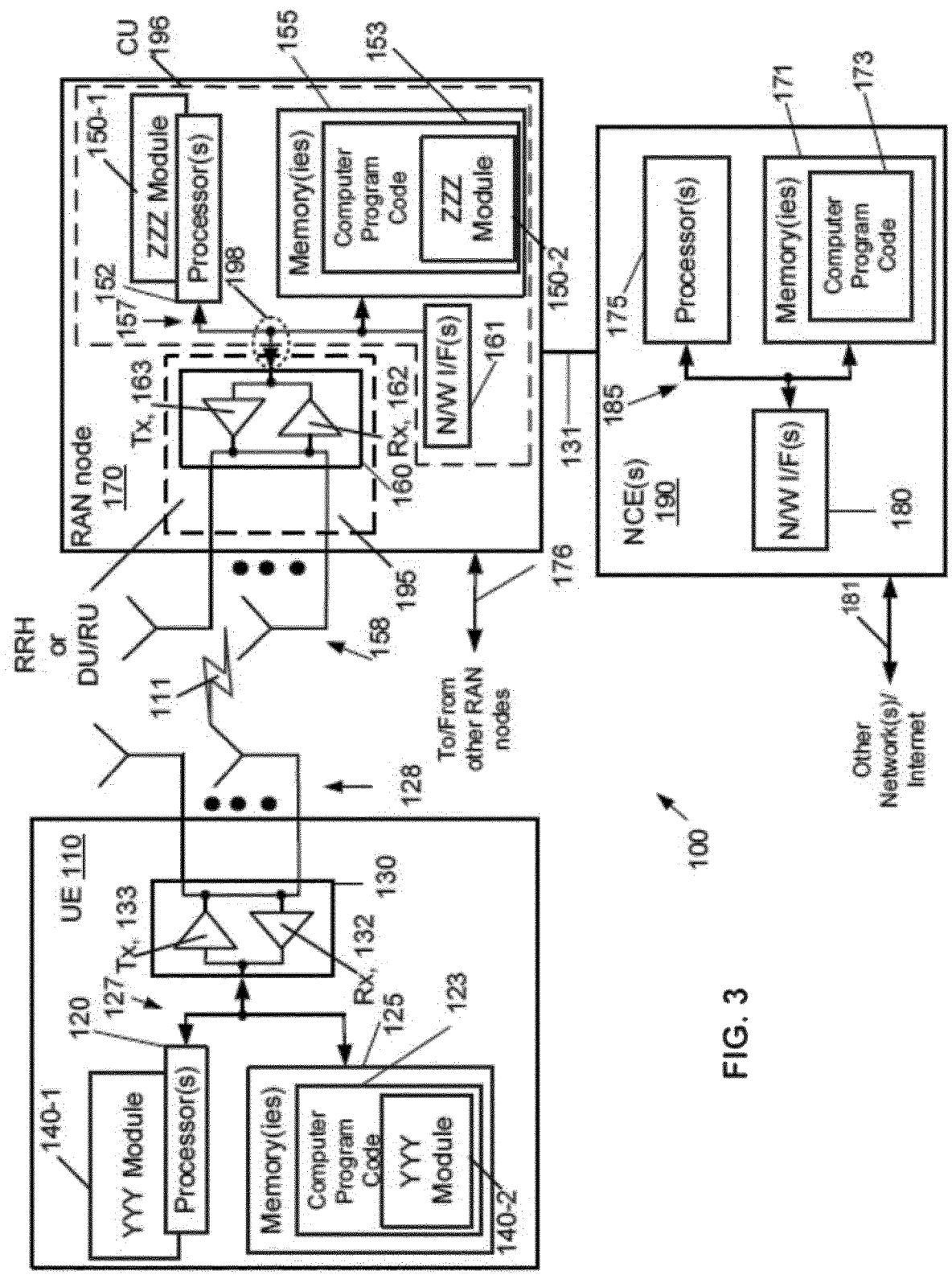
FIG. 3 is a block diagram of one possible and non-limiting exemplary system in which the exemplary embodiments may be practiced.

Before turning to a further discussion of the current invention, we turn to FIG. 3, which is a block diagram of one possible and non-limiting exemplary system in which the exemplary embodiments may be practiced.

Please note that the word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims The exemplary embodiments herein describe enhancements of beam failure recovery procedure by utilizing interference measurements, specifically employing techniques for L1-SINR (or simply SINR or SINR used for determining hypothetical PDCCH BLER) based candidate beam selection for beam failure recovery.

Before a fuller description of these techniques, a system into which the exemplary embodiments concerning CORESET and QCL association in beam recovery procedure and concerning beam failure recovery procedure by utilizing interference measurements may be used is described is presented in FIG. 3, which figure shows a block diagram of one possible and non-limiting exemplary system in which the exemplary embodiments may be practiced.

A user equipment (UE) 110, radio access network (RAN) node 170, and network control element(s) (NCE(s)) 190 are illustrated. In FIG. 3, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. Note that the YYY module allows functionality for the usage of control resources for data transmission where any method or examples of such embodiments discussed herein can be practiced.

The UE 110 includes a YYY module 140, comprising one of or both parts 140-1 and/or 140-2, which may be implemented in a number of ways. The YYY module 140 may be implemented in hardware as YYY module 140-1, such as being implemented as part of the one or more processors 120. The YYY module 140-1 may be implemented also as an integrated circuit or through other hardware such as a programmable gate array. In another example, the YYY module 140 may be implemented as YYY module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 (which could be referred to an eNB) via a wireless link 111.

The RAN node 170 is a base station (e.g., for LTE, long term evolution eNB (an evolved NodeB or a New Radio 5G NodeB, which would denoted as gNB), or 5G base station) that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the NCE(s) 190). The ng-eNB is a node providing E-UTRA user plane and control plane protocol terminations towards the UE, and connected via the NG interface to the 5GC. The NG-RAN node may include multiple gNBs, which may also include "logical" elements, namely a central unit (CU) (gNB-CU) 196 and distributed unit(s) (DUs) (gNB-DUs), of which DU 195 is shown. The CU is a logical node which may include the functions (i.e., gNB functions) such as transfer of user data, mobility control, radio access network sharing, positioning, session management, etc., except those functions allocated exclusively to the DU. The CU may control the operation of DUs over a front-haul (F1) interface. The CU may also be known as BBU/REC/RCC/C-RAN/V-RAN. The DU is a logical node which may include a subset of the functions (i.e., gNB functions), depending on the functional split option. The operation of the DU may be controlled by the CU. The DU may also be known with other names like RRH/RRU/RE/RU. The DU may also contain intra-DU interfaces, e.g. E1 interface between its user and control plane functions. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. DU 195 may also contain its own memory/memories and processor(s), and/or other hardware, but these are not shown. Note that the ZZZ module allows functionality for the usage of control resources for data transmission where any method examples of such embodiments discussed herein can be practiced.

The RAN node 170 includes a ZZZ module 150, comprising one of or both parts 150-1 and/or 150-2, which may be implemented in a number of ways. The ZZZ module 150 may be implemented in hardware as ZZZ module 150-1, such as being implemented as part of the one or more processors 152. The ZZZ module 150-1 may be implemented also as an integrated circuit or through other hardware such as a programmable gate array. In another example, the ZZZ module 150 may be implemented as ZZZ module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the ZZZ module 150 may be distributed, such as being distributed between the DU 195 and the CU 196, or be implemented solely in the DU 195.

The one or more network interfaces 161 communicate over a network such as via the links 176 and 131. Two or more base stations 170 communicate using, e.g., link 176. The link 176 may be wired or wireless or both and may implement, e.g., an X2 interface, Xn for 5G, an X1 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like.

For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the whole base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network control element (NCE) (or elements, NCE(s)) 190 that may include MME (Mobility Management Entity)/SGW (Serving Gateway) or as described in 5G or NR core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the NCE(s) 190, and note that both 5G and LTE functions might be supported. The RAN node 170 is coupled via a link 131 to the NCE 190. The link 131 may be implemented as, e.g., an NG interface for 5G, or an S1 interface for LTE, or other suitable interface for other standards. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization may still be implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular phones such as smart devices, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, internet appliances permitting wireless Internet access and browsing, tablets with wireless communication capabilities, as well as portable units or terminals that incorporate combinations of such functions. In addition, various embodiments of the user equipment include machines, communicators and categories of equipment, which are not primarily or not at all in use by human interaction.

The current architecture in LTE networks is fully distributed in the radio and fully centralized in the core network. The low latency requires bringing the content close to the radio which leads to local break out and multi-access edge computing (MEC). 5G may use edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services and augmented reality. In radio communications, using edge cloud may mean node operations to be carried out, at least partly, in a server, host or node operationally coupled to a remote radio head or base station comprising radio parts. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

One possible manner to carry out embodiments described herein is with an edge cloud using a distributed computing system. An exemplary embodiment comprises a radio node connected to a server. Exemplary embodiments implementing the system allow the edge cloud server and the radio node as stand-alone apparatuses communicating with each other via a radio path or via a wired connection or they may be located in a same entity communicating via a wired connection.

FIG. 4 is a logic flow diagram for a beam recovery procedure employing CORESET and CQL association by illustrating the operation of an exemplary method 400, a result of execution of computer program instructions embodied on a computer readable memory, functions performed by logic implemented in hardware, and/or interconnected means for performing functions in accordance with exemplary embodiments. Parts or all of method 400 could be performed in module YYY or module ZZZ as appropriate.

As can be seen from FIG. 4, In item 402, the UE is configured in a number of ways. First, the UE is configured with a TCI table to indicate source RSs for different QCL parameters. The UE is configured with one or multiple CORESETs for NR-PDCCH reception. Then the UE is configured with multiple TCI states (multiple transmit beams) associated with a CORESET. And, then the UE is configured with a TCI state that is active for the CORESET. The UE is also configured with the BFRQ resource associated with one or multiple TCI states associated with a CORESET.

Given these configurations, per item 404, the UE determines a beam failure and detects a replacement candidate beam.

In response to the replacement candidate beam being associated with a TCI state associated with a CORESET, per item 406, the UE triggers a BFRQ resource transmission associated with the replacement candidate beam.

Thereafter, as seen in item 408, the UE monitors the CORESET of the DL RS associated with the replacement candidate beam via TCI linkage for PDCCH to receive a response to BFRQ.

Figure 5:
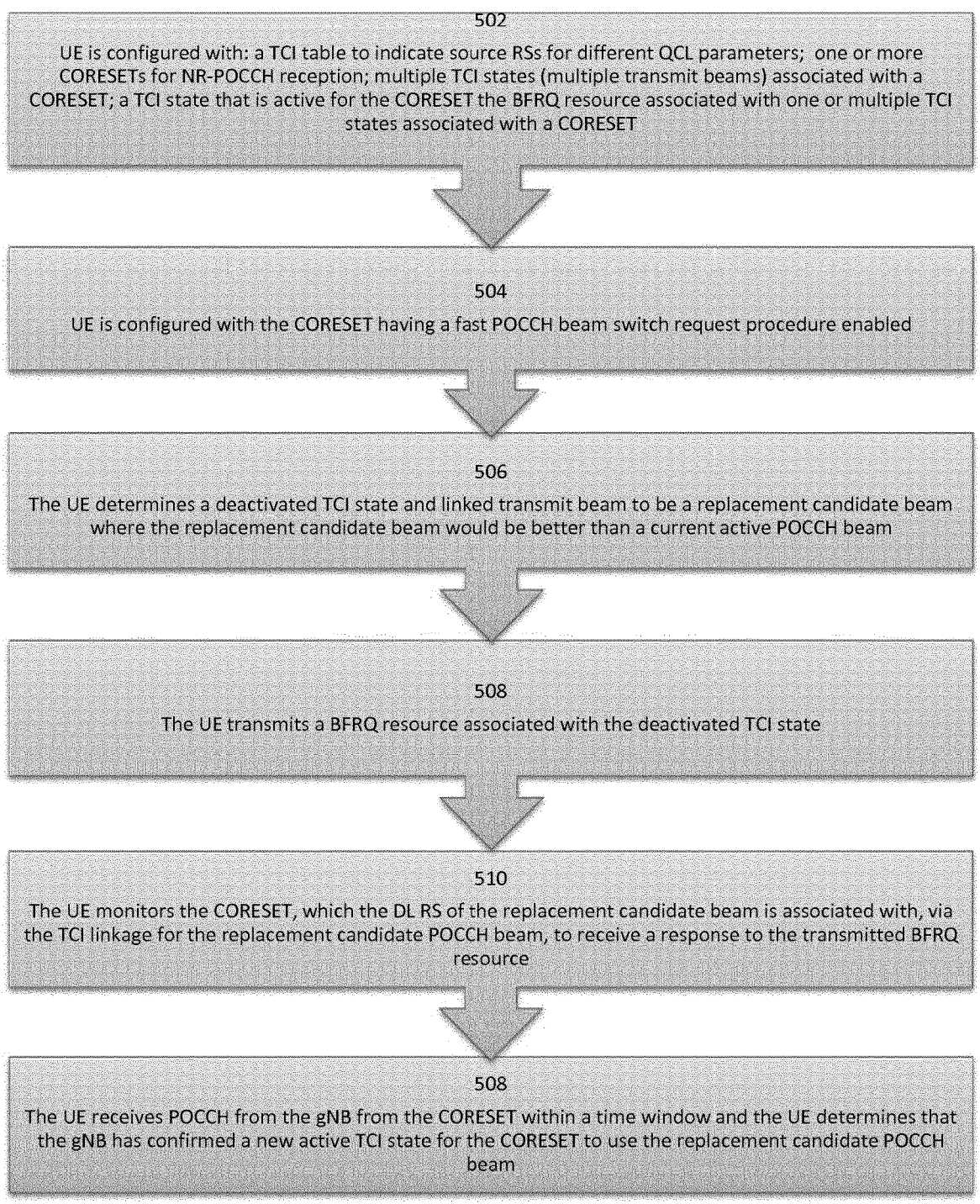
FIG. 5 is a logic flow diagram of another exemplary method for CORESET and QCL association in beam recovery procedure, a result of execution of computer program instructions embodied on a computer readable memory, functions performed by logic implemented in hardware, and/or interconnected means for performing functions in accordance with exemplary embodiments.

FIG. 5 is a logic flow diagram for a beam recovery procedure employing CORESET and CQL association by illustrating the operation of an exemplary method 500, a result of execution of computer program instructions embodied on a computer readable memory, functions performed by logic implemented in hardware, and/or interconnected means for performing functions in accordance with exemplary embodiments. Parts or all of method 500 could be performed in module YYY or module ZZZ as appropriate.

As with item 402 described above, the UE in this exemplary embodiment is also configured with the following as shown in item 502: a TCI table to indicate source RSs for different QCL parameters; one or multiple CORESETs for NR-PDCCH reception; multiple TCI states (multiple transmit beams) associated with a CORESET; a TCI state that is active for the CORESET; and the BFRQ resource associated with one or multiple TCI states associated with a CORESET.

In this exemplary embodiment, per item 504, UE is further configured with the CORESET having a fast PDCCH beam switch request procedure enabled.

Given these configurations, per item 506, the UE determines a deactivated TCI state and linked transmit beam to be a replacement candidate beam where the replacement candidate beam would be better than a current active PDCCH beam.

The UE transmits a BFRQ resource associated with the deactivated TCI state as shown in item 508.

Item 510 shows that the UE monitors the CORESET, which the DL RS of the replacement candidate beam is associated with, via the TCI linkage for the replacement candidate PDCCH beam, to receive a response to the transmitted BFRQ resource.

The UE receives PDCCH from the gNB from the CORESET within a time window in item 512. Finally, as shown in item 514, the UE determines that the gNB has confirmed a new active TCI state for the CORESET to use the replacement candidate PDCCH beam.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

Without in any way limiting the scope, interpretation, or application of the claims appearing below, an advantage or technical effect of one or more of the exemplary embodiments disclosed herein is that by enabling the recovery to be performed to RS resources that are already associated with UE specific CORESET, system PDCCH capacity can be preserved.

A further advantage or technical effect of one or more of the exemplary embodiments disclosed herein is that it allows a fast NR-PDCCH beam switch procedure to be enabled (second embodiment) without need for first requesting beam measurement results from the UE before performing transmit beam change.

Embodiments herein concerning CORESET and QCL association in beam recovery procedure may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 3. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

An example of an embodiment concerning CORESET and QCL association in beam recovery procedure, which can be referred to as item 1, is a method comprising: determining a second beam for a node in a wireless communications system to switch to from a first beam; transmitting a BFRQ resource associated with the second beam; and monitoring a CORESET of a DL RS associated with the second beam via TCI linkage for PDCCH to receive a response to the BFRQ resource transmission.

An example of a further embodiment concerning CORESET and QCL association in beam recovery procedure, which can be referred to as item 2, is the method of item 1 where the node is configured with the CORESET having a fast PDCCH beam switch request procedure enabled.

An example of a further embodiment concerning CORESET and QCL association in beam recovery procedure, which can be referred to as item 3, is the method of any preceding item, further comprising: receiving a PDCCH from the CORESET within a time window.

An example of a further embodiment concerning CORESET and QCL association in beam recovery procedure, which can be referred to as item 4, is the method of any preceding item, further comprising: ascertaining confirmation for the switch to a new active TCI state for the CORESET.

An example of a further embodiment concerning CORESET and QCL association in beam recovery procedure, which can be referred to as item 5, is the method of any preceding item where the determining comprises favoring a deactivated or inactive TCI state of the second beam over the PDCCH of the first beam.

An example of a further embodiment concerning CORESET and QCL association in beam recovery procedure, which can be referred to as item 6, is the method of item 5 where the favoring comprises assessing the quality of the inactive TCI state, measured using corresponding DL RS, to be higher than quality of an active TCI state of the first beam plus an offset value, where the offset value may be positive, negative or zero, or higher than a predetermined threshold value.

An example of a further embodiment concerning CORESET and QCL association in beam recovery procedure, which can be referred to as item 7, is the method of any of items 1-4 further comprising: prior to the determining, detecting a failure of the first beam.

An example of a further embodiment concerning CORESET and QCL association in beam recovery procedure, which can be referred to as item 8, is the method of item 7, further comprising: after the determining, in response to the second beam being associated with a TCI states also associated with the CORESET, triggering the transmitting.

An example of a further embodiment concerning CORESET and QCL association in beam recovery procedure, which can be referred to as item 9, is the method of any preceding item where the node is a user equipment.

An example of an embodiment concerning CORESET and QCL association in beam recovery procedure, which can be referred to as item 10, is the method of any preceding item where the node is configured with a TCI table to indicate source RSs for different QCL parameters.

An example of a further embodiment concerning CORESET and QCL association in beam recovery procedure, which can be referred to as item 11, is the method of any preceding item where the node is configured with one or more CORESETs for NR-PDCCH reception.

An example of a further embodiment concerning CORESET and QCL association in beam recovery procedure, which can be referred to as item 12, is the method of any preceding item where the node is configured with multiple TCI states (multiple transmit beams) associated with each CORESET of the one or more CORESETs.

An example of a further embodiment concerning CORESET and QCL association in beam recovery procedure, which can be referred to as item 13, is the method of any preceding item where the node is configured with a TCI state that is active for a CORESET.

An example of a further embodiment concerning CORESET and QCL association in beam recovery procedure, which can be referred to as item 14, is the method of any preceding item where the node is configured with the BFRQ resource associated with one or multiple TCI states associated with a CORESET.

An example of another embodiment concerning CORESET and QCL association in beam recovery procedure, which can be referred to as item 15, is an apparatus comprising: determining a second beam for a node in a wireless communications system to switch to from a first beam; transmitting a BFRQ resource associated with the second beam; and monitoring a CORESET of a DL RS associated with the second beam via TCI linkage for PDCCH to receive a response to the BFRQ resource transmission.

An example of another further embodiment concerning CORESET and QCL association in beam recovery procedure, which can be referred to as item 16, is the apparatus of item 15 where the node is configured with the CORESET having a fast PDCCH beam switch request procedure enabled.

An example of another further embodiment concerning CORESET and QCL association in beam recovery procedure, which can be referred to as item 17, is the apparatus of any of items 15-16, where the at least one memory and the computer code are further configured, with the at least one processor, to cause the apparatus to at least perform the following: receiving a PDCCH from the CORESET within a time window.

An example of another further embodiment concerning CORESET and QCL association in beam recovery procedure, which can be referred to as item 18, is the apparatus of any of items 15-17, further comprising: ascertaining confirmation for the switch to a new active TCI state for the CORESET.

An example of another further embodiment concerning CORESET and QCL association in beam recovery procedure, which can be referred to as item 19, is the apparatus of any of items 15-18 where the determining comprises favoring a deactivated or inactive TCI state of the second beam over the PDCCH of the first beam.

An example of another further embodiment concerning CORESET and QCL association in beam recovery procedure, which can be referred to as item 20, is the apparatus of item 19 where the favoring comprises assessing the quality of the inactive TCI state, measured using corresponding DL RS, to be higher than quality of an active TCI state of the first beam plus an offset value, where the offset value may be positive, negative or zero, or higher than a predetermined threshold value.

An example of another further embodiment concerning CORESET and QCL association in beam recovery procedure, which can be referred to as item 21, is the apparatus of any of items 15-18, where at least one processor and at least one memory including computer program code are further configured, with the at least one processor, to cause the apparatus to at least perform the following: prior to the determining, detecting a failure of the first beam.

An example of another further embodiment concerning CORESET and QCL association in beam recovery procedure, which can be referred to as item 22, is the apparatus of item 21, where the at least one memory and the computer code are further configured, with the at least one processor, to cause the apparatus to at least perform the following: after the determining, in response to the second beam being associated with a TCI states also associated with the CORESET, triggering the transmitting.

An example of another further embodiment concerning CORESET and QCL association in beam recovery procedure, which can be referred to as item 23, is the apparatus of any of items 15-22 where the node is a user equipment.

An example of another further embodiment concerning CORESET and QCL association in beam recovery procedure, which can be referred to as item 24, is the apparatus of any of items 15-23 where the node is configured with a TCI table to indicate source RSs for different QCL parameters.

An example of another further embodiment concerning CORESET and QCL association in beam recovery procedure, which can be referred to as item 25, is the apparatus of any of items 15-24 where the node is configured with one or more CORESETs for NR-PDCCH reception.

An example of another further embodiment concerning CORESET and QCL association in beam recovery procedure, which can be referred to as item 26, is the apparatus of any of items 15-25 where the node is configured with multiple TCI states (multiple transmit beams) associated with each CORESET of the one or more CORESETs.

An example of another further embodiment concerning CORESET and QCL association in beam recovery procedure, which can be referred to as item 27, is the apparatus of any of items 15-26 where the node is configured with a TCI state that is active for a CORESET.

An example of another further embodiment concerning CORESET and QCL association in beam recovery procedure, which can be referred to as item 28, is the apparatus of any of items 15-27 where the node is configured with the BFRQ resource associated with one or multiple TCI states associated with a CORESET.

An example of yet another embodiment concerning CORESET and QCL association in beam recovery procedure, which can be referred to as item 29, is an apparatus comprising means for determining a second beam for a node in a wireless communications system to switch to from a first beam; transmitting a BFRQ resource associated with the second beam; and monitoring a CORESET of a DL RS associated with the second beam via TCI linkage for PDCCH to receive a response to the BFRQ resource transmission.

An example of yet other embodiment concerning CORESET and QCL association in beam recovery procedures, is the apparatus of item 29 additionally preforming the steps of any of the methods of any of items 2-14.

An example of a still further embodiment concerning CORESET and QCL association in beam recovery procedure, which can be referred to as item 30, is a computer program code with code for performing any of the methods of claims 1-14.

An example of another still further embodiment concerning CORESET and QCL association in beam recovery procedure, which can be referred to as item 31, is a computer program product where the computer program of item 30 is embodied on a non-transitory computer readable medium.

An example of yet another embodiment concerning CORESET and QCL association in beam recovery procedure, which can be referred to as item 32, is a computer program product embodied on a non-transitory computer-readable medium in which a computer program is stored that, when being executed by a computer, is configured to provide instructions to control or carry out any of the methods of items 1-14.

It is also noted herein that while the above describes examples of embodiments concerning CORESET and QCL association in beam recovery procedures of the invention, these descriptions should not be viewed in a limiting sense. Rather, there are several variations and modifications which may be made without departing from the scope of the present invention.

If desired, the different functions discussed herein may be performed in a different order and/or concurrently with each other. Furthermore, if desired, one or more of the above-described functions may be optional or may be combined.

Although various aspects of the invention are set out above, other aspects of the invention comprise other combinations of features from the described embodiments. Moreover, while the above describes exemplary embodiments of the invention, these descriptions should not be viewed in a limiting sense. Rather, there are several variations and modifications which may be made without departing from the scope of the present invention.

Having thus introduced one suitable but non-limiting technical context for the practice of the exemplary embodiments of this invention relating to enhancements of beam failure recovery procedure by utilizing interference measurements, these exemplary embodiments will now be described with greater specificity.

Throughout embodiments concerning beam failure recovery procedure by utilizing interference measurements, in the described methods, the L1-SINR may be replaced by e.g. BLER threshold (in this case the comparison to thresholds need to be reversed accordingly since the low SINR value means high BLER and vice versa.) or SINR (simply interference measurement performed by UE such that signal quality and interference is measured and measurement result is produced) or SINR used for hypothetical BLER (e.g. PDCCH BLER, PUCCH BLER, PDSCH BLER, PUSCH BLER) calculation or RSRQ or any interference measurement or any quality based measurement. In other words, instead of specifically using L1-SINR, the use of BLER or SINR or any interference based metric (including e.g. measurements for interference or e.g. measurements for interference and RSRP to form a quality metric) for comparisons would yield acceptable results. As one example, quality or quality based may refer to any metric that would provide additional information to e.g. received power based measurements, and any example (such as the thresholds and the metrics used for comparing the signal quality to quality based metric) described herein should not be seen limited to any specific metric.

In addition to PDCCH, L1-SINR/SINR may be calculated for reference signals/beams (CSI-RS, SSB) corresponding, PUCCH, PDSCH or PUSCH in case beam recovery is performed for recovering other channels than PDCCH. Thus the method in this invention can be used for recovering any channel that can be recovered by selecting and indicating new candidate beam. For example, the downlink PDCCH beams and uplink PUCCH beams may be different, thus the uplink control channels may need to be recovered while the downlink is still in non-failure condition and vice versa.

In this invention we provide a method/procedure for L1-SINR (or simply SINR, or SINR used for determining hypothetical PDCCH BLER) based candidate beam selection for beam failure recovery, with two options when the UE is configured with CFRA candidates and other options for an aspect of the invention where the UE may evaluate CFRA candidates based on SINR only when the beamFailureRecoveryTimer is running.

Regarding the first option when a UE is configured with CFRA candidates, the UE measures and calculates L1-SINR (or hypothetical PDCCH BLER) for a restricted set of beam recovery candidates. The L1-SINR is calculated for set of q1 (candidate beams that can be indicated using CFRA preambles). In examples of options, where L1-SINR is calculated for CSI-RS candidates, SSB candidates or for both CSI-RS and SSB candidates in set of q1, the network may configure the subset or selected set of candidates for L1-SINR measurement. For instance a subset is also possible: SSB (or SSBs) in q1; CSI-RS (or CSI-RSs) in q1; or all RS in the set of q1. The UE compares the L1-SINR measurements of CFRA-candidates RS in set q1 (or the subset of CFRA candidates) to network configured threshold. As an example, the threshold is a SINR threshold threshold_SINR_recovery or in more general view in any method described herein, a signal quality threshold or signal quality based threshold. On the other hand, depending on the metric used for candidate selection, the threshold may be configured as BLER threshold instead of SINR or the threshold may be SINR threshold used for determining the BLER (or any quality based metric). If multiple CFRA candidates are above the threshold_SINR_recovery, then the UE selects one of the candidates. Alternatively, the UE may select one candidate with the highest RSRP (from among the group of candidates that are above threshold_SINR_recovery). Alternatively or additionally, the UE may select one candidate from the candidates for which both SINR is above threshold_SINR_recovery and RSRP is above an RSRP threshold threshold RSRP recovery (this threshold may or may not correspond to the 0 threshold (RSRP threshold used for candidate beam selection in RSRP based selection). If no CFRA candidate is above threshold_SINR_recovery or if no candidate is selected according to the criteria listed within this paragraph above, then the UE switches to a CBRA based recovery and selects candidates above rsrp-ThresholdSSB (SSB selection threshold in CBRA procedure). In one example, if no CFRA candidate is above threshold_SINR_recovery and the UE selected candidate is based on RSRP, then the UE releases the CFRA candidate resources upon successful completion of beam failure recovery. In more general view UE may release CFRA candidates when it successfully completes the CBRA based bream recovery, or it completes CFRA based recovery.

Regarding the second option when a UE is configured with CFRA candidates, the UE measures L1-RSRP for CFRA candidate beams and selects candidates above $Q_{in,LR}$ threshold (RSRP threshold). If no candidates are above the threshold, the L1-SINR measurements are not performed for CFRA candidates. Then, for the selected CFRA candidates, the UE determines their L1-SINR is above the threshold by comparing the each selected CFRA candidate's L1-SINR to threshold_SINR_recovery. If multiple CFRA candidates are above the threshold_SINR_recovery, then the UE selects one of those multiple candidates. Alternatively, UE may select one with highest SINR (among the group of candidates above SINR threshold or $Q_{in}$/BLER). On the other hand, if no CFRA candidate is above threshold_SINR_recovery, then the UE selects one of the CFRA candidates above $Q_{in,LR}$ (the RSRP threshold).

As an option, if no CFRA candidate was above threshold_SINR_recovery and UE selected candidate based on RSRP, the UE releases the CFRA candidate resources upon successful completion of beam failure recovery. In an alternative/additional option, UE may perform L1-SINR evaluation for CBRA candidates e.g. in a case where it switches from CFRA to CBRA or in case CFRA recovery is not configured or used. UE first determines CBRA candidates with L1-RSRP (e.g. SSB or CSI-RS) above threshold1 (RSRP)) which may be same as rsrp-ThresholdSSB (SSB selection threshold in CBRA procedure. Then UE determines L1-SINR for SSBs with L1-RSRP above the threshold, or up to N SSBs with highest L1-RSRP (to restrict the number of L1-SINR measurements). UE then selects candidate with highest SINR, or it selects one the candidates with SINR above a SINR threshold. If no candidate is above SINR threshold it selects one SSB with L1-RSRP above the threshold. If no SSB is above the RSRP threshold, UE selects any SSB. This option may be used alternatively or additionally to the methods discussed herein.

The technique used prior to the current invention holds that for determining whether a beam failure instance has occurred, the UE evaluates resources configured in the set of q0 (CSI-RS/SSB) and compares the quality to the threshold $Q_{out,LR}$. The evaluation is SINR based; more specifically, the UE estimates the PDCCH BLER using hypothetical parameters. However, only the RSRP is used as selection criteria for candidate beam selection for beam failure recovery. While RSRP measurement may be considered to be less complex than SINR based (such that in RSRP the interference component is not calculated/measured) Using only RSRP may not be optimal solution since UE may select a new candidate with good RSRP but a resource that suffers from high interference causing UE potentially experience beam failure again and trigger recovery.

A UE could be configured to perform with quality-based beam measurements which would enable the candidate beam selection for beam recovery so that the UE would not select beam pair link with high interference. However, for the candidate beam selection based on BLER/SINR it would not be feasible to evaluate interference for each candidate in a cell as it would mean potentially increased latency and complexity in the failure recovery procedure.

With respect to either option described above, in one aspect of the invention, the UE may evaluate CFRA candidates based on SINR only when the beamFailureRecoveryTimer is running. Alternatively, a timer may be configured separately for SINR based beam recovery Timer_SINR_Recovery. While the timer is running, UE evaluates L1-SINR for CFRA candidates. Once the timer expires, UE does not evaluate L1-SINR for CFRA or CBRA candidates.

In another aspect of the invention, network may additionally (to q1) or alternatively configure UE with resources (SSB, CSI-RS) for which UE determines L1-SINR when performing recovery. UE determines whether CFRA or CBRA signaling can be used to indicate the candidate.

In one aspect of the invention when UE has been selecting the candidate beam using the methods described herein, e.g. it has determined to select CSI-RS beam but the selected candidate beam CFRA resources can only indicate SSBs, the UE determines to select the SSB that is QCL'd with the selected CSI-RS (QCL association may be, for instance, typed as one of typeA, typeB, typeC, etc.).

In another aspect of the present invention, the threshold_SINR_recovery may be set to as one of the following: an explicit value configured by network (or UE derives the value using other threshold parameter; $Q_{out,LR}$ or $Q_{in,RLM}$ (SINR/BLER threshold used as RLM in-sync criteria) threshold for beam failure detection; or $Q_{in}$ (IS) or $Q_{out}$ threshold of RLM (in BLER), where the UE applies X percentage unit offset for candidate beam selection, such that 2% IS+offset_candidate (2%) yielding 4% as candidate beam BLER or, alternatively, 10% OOS−offset_candidate (2%) yielding 8% candidate beam BLER. Above are merely examples of ways to set the threshold. The threshold_SINR_recovery may be derived using the hypothetical BLER values or determined BLER values. Threshold may also be set explicitly to specific value such as SINR threshold or BLER threshold or any metric used for determining quality based beam recovery. In some examples UE may determine the threshold value by itself. Alternatively the threshold may be determined using the beam failure threshold $Q_{out,LR}$ (that may be derived from RLM threshold i.e. 10% or any other value). In one way an offset value may be used to derive the threshold_SINR_recovery, based on IS/OOS thresholds of RLM or OOS as described herein. In some examples the offset may not be applied i.e. if threshold_SINR_recovery or the corresponding hypothetical BLER value for beam failure detection ($Q_{out,LR}$ is used also as "in-sync" threshold. When the corresponding SINR is above (or above or equal) the $Q_{out,LR}$ the quality is considered to be "in-sync" and otherwise (or below or equal) out-of-sync.

In yet another aspect, if the UE selects a CFRA candidate based on RSRP, then the UE selects one CFRA candidate above the RSRP threshold, indicates that selection, and generates BFR MAC CE that indicates up to N q1 candidates with lowest BLER/highest SINR, where the MAC CE is transmitted in msg3.

In a still further alternative aspect of the invention, if no CFRA candidates are configured, then the UE determines L1-SINR for N-highest SS-RSRP above rsrp-ThresholdSSB and selects the candidate with highest SINR.

FIG. 6 is a logic flow diagram regarding the first option described above concerning beam failure recovery procedure by utilizing interference measurements. This figure illustrates the operation of an exemplary method 600, comprising the steps of items 602, 604, and 606, and is a result of execution of computer program instructions embodied on a computer readable memory, functions performed by logic implemented in hardware, and/or interconnected means for performing functions in accordance with exemplary embodiments. For instance, the YYY module 140 may include multiples ones of the blocks in FIG. 3, where each included block is an interconnected means for performing the function in the block. The blocks in FIG. 6 are assumed to be performed by the UE 110, e.g., under control of the YYY module 140 at least in part.

In step 602, a user equipment, in a wireless communications network, determines a measure of signal quality for a restricted set of beam recovery candidates. In step 604, the UE compares the measure of signal quality of contention free random access candidates reference signal in the restricted set of beam recovery candidates or a subset of contention free random access candidates to a signal quality based recovery threshold. In step 606, the UE selects the at least one candidate signal with signal quality above the signal quality based recovery threshold from a candidate beam reference signal list.

Figure 7:
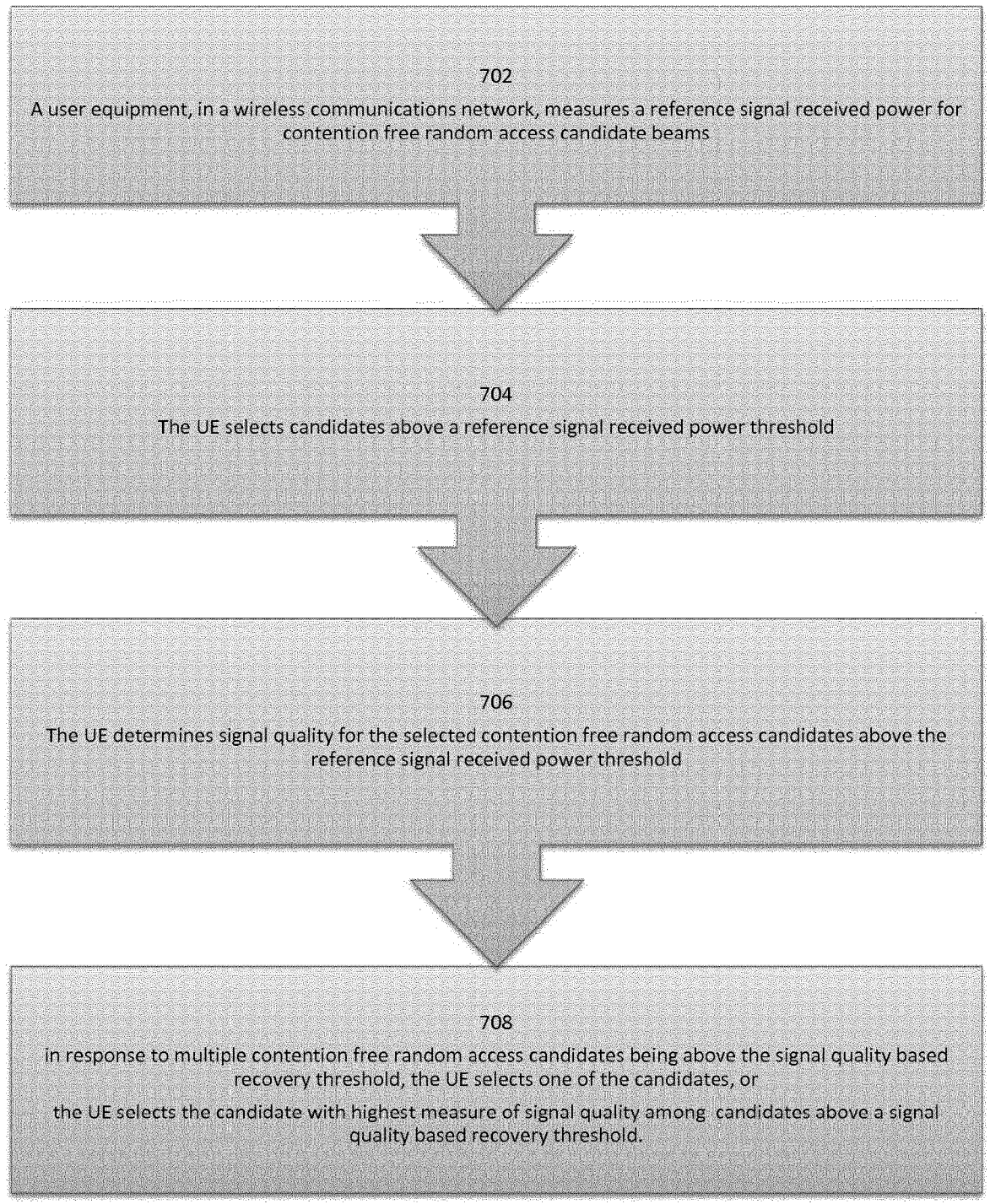
FIG. 7 is a logic flow diagram of another exemplary method for utilizing interference measurements in beam recovery procedure, and illustrate the operation of exemplary methods, a result of execution of computer program instructions embodied on a computer readable memory, functions performed by logic implemented in hardware, and/or interconnected means for performing functions in accordance with exemplary embodiments.

FIG. 7 is a logic flow diagram regarding the second option described above concerning beam failure recovery procedure by utilizing interference measurements. This figure illustrates the operation of an exemplary method 700, comprising the steps of items 702, 704, 706, and 708, and is a result of execution of computer program instructions embodied on a computer readable memory, functions performed by logic implemented in hardware, and/or interconnected means for performing functions in accordance with exemplary embodiments. For instance, the YYY module 140 may include multiples ones of the blocks in FIG. 3, where each included block is an interconnected means for performing the function in the block. The blocks in FIG. 6 are assumed to be performed by the UE 110, e.g., under control of the YYY module 140 at least in part.

In step 702, a user equipment, in a wireless communications network, measures a reference signal received power for contention free random access candidate beams. In step 704, the UE selects candidates above a reference signal received power threshold. In step 706, the UE determines signal quality for the selected contention free random access candidates above the reference signal received power threshold. In step 708, in response to multiple contention free random access candidates being above the signal quality based recovery threshold, the UE selects one of the candidates, or the UE selects the candidate with highest measure of signal quality among candidates above a signal quality based recovery threshold.

Without in any way limiting the scope, interpretation, or application of the claims appearing below, a technical effect of one or more of the example of embodiments disclosed herein is that the proposed mechanism avoids having the UE making beam recovery onto a new beam with high interference, thus likely preventing back-to-back beam failure occurring. Another technical effect of one or more of the example embodiments disclosed herein is that, as a result of the proposed mechanism, radio link failure rate is decreased as well as beam recovery latency is improved.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As noted earlier in regard to embodiments herein concerning CORESET and QCL association in beam recovery procedure, embodiments herein concerning beam failure recovery procedure utilizing interference measurements may also be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 3. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

An example of an embodiment concerning utilizing interference measurements in beam recovery procedure, which can be referred to as item 101, is a method comprising: determining, by a user equipment in a wireless communications network, a measure of signal quality for a restricted set of beam recovery candidates; comparing the measure of signal quality of contention free random access candidates reference signal in the restricted set of beam recovery candidates or a subset of contention free random access candidates to a signal quality based recovery threshold; selecting the at least one candidate signal with signal quality above the signal quality based recovery threshold from a candidate beam reference signal list.

An example of another embodiment concerning utilizing interference measurements in beam recovery procedure, which can be referred to as item 102, is the method of item 101, wherein the candidate beam reference signal list comprises: at least one synchronization signal physical broadcast channel block of a plurality of synchronization signal physical broadcast channel blocks; at least one channel state information reference signal of a plurality of channel state information reference signals; or at least one synchronization signal physical broadcast channel block of a plurality of synchronization signal physical broadcast channel blocks and at least one channel state information reference signal of a plurality of channel state information reference signals.

An example of another embodiment concerning utilizing interference measurements in beam recovery procedure, which can be referred to as item 103, is the method of item 101, wherein the selecting further comprises: choosing from the at least one synchronization signal physical broadcast channel block or the at least one channel state information reference signal with highest reference signal received power.

An example of another embodiment concerning utilizing interference measurements in beam recovery procedure, which can be referred to as item 104, is the method of item 101, wherein the measure of signal quality is based in a signal to interference noise ratio for a physical layer.

An example of another embodiment concerning utilizing interference measurements in beam recovery procedure, which can be referred to as item 105, is the method of item 101, further comprising: in response to the at least one synchronization signal physical broadcast channel block additionally having an synchronization signal reference signal received power above a synchronization signal physical broadcast channel block reference signal received power threshold or the at least one channel state information reference signal additionally having a channel state information reference signal received power above a channel state information reference signal reference signal received power threshold, selecting the at least one synchronization signal physical broadcast channel block or the at least one channel state information reference signal from the candidate beam reference signal list.

An example of another embodiment concerning utilizing interference measurements in beam recovery procedure, which can be referred to as item 106, is the method of item 101, further comprising: in response to no contention free random access candidate being above the signal quality based recovery threshold, basing recovery on contention based random access; and selecting candidates above a synchronization signal physical broadcast channel block reference signal received power threshold.

An example of another embodiment concerning utilizing interference measurements in beam recovery procedure, which can be referred to as item 107, is the method of item 101, further comprising: in response to no contention free random access candidate being above the signal quality recovery threshold, selecting a candidate based on reference signal received power.

An example of another embodiment concerning utilizing interference measurements in beam recovery procedure, which can be referred to as item 108, is the method of item 106, further comprising: releasing the contention free random access candidate resources upon successful completion of beam failure recovery.

An example of another embodiment concerning utilizing interference measurements in beam recovery procedure, which can be referred to as item 109, is the method of item 101, wherein the determining is based on at least one of: the measure of signal quality being calculated for set of candidate beams that can be indicated using contention free random access preambles; or the user equipment being configured with signal quality measurements on subset of contention free random access candidates in set of candidate beams.

An example of another embodiment concerning utilizing interference measurements in beam recovery procedure, which can be referred to as item 110, is the method of item 101, wherein the measure of signal quality is determined for channel state information reference signal candidates, synchronization signal physical broadcast channel block candidates, or for both channel state information reference signal and synchronization signal physical broadcast channel block candidates.

An example of another embodiment concerning utilizing interference measurements in beam recovery procedure, which can be referred to as item 111, is the method of item 103, wherein determining the signal to interference noise ratio for a physical layer is replaced with determining a hypothetical physical downlink control channel block error ratio, wherein the threshold is configured in terms of block error ratio instead of the signal quality, wherein selecting the at least one synchronization signal physical broadcast channel block or the at least one channel state information reference signal from the candidate beam reference signal list is with block error ratio below a block error ratio threshold.

An example of another embodiment concerning utilizing interference measurements in beam recovery procedure, which can be referred to as item 112, is the method of item 101, wherein the signal quality based recovery threshold is configured by the network.

An example of another embodiment concerning utilizing interference measurements in beam recovery procedure, which can be referred to as item 113, is a method comprising: measuring, by an user equipment in a wireless communications network, a reference signal received power for contention free random access candidate beams; selecting candidates above a reference signal received power threshold; determining signal quality for the selected contention free random access candidates above the reference signal received power threshold; in response to multiple contention free random access candidates being above the signal quality based recovery threshold, selecting one of the candidates, or selecting the candidate with highest measure of signal quality among candidates above a signal quality based recovery threshold.

An example of another embodiment concerning utilizing interference measurements in beam recovery procedure, which can be referred to as item 114, is the method of item 113, further comprising: in response to no contention free random access candidate being above the signal quality recovery threshold, selects the contention free random access candidates above the reference signal received power threshold.

An example of another embodiment concerning utilizing interference measurements in beam recovery procedure, which can be referred to as item 115, is the method of item 113, further comprising: in response to no contention free random access candidate being above the signal quality recovery threshold; selecting candidate based on reference signal received power; releasing the contention free random access candidate resources upon successful completion of beam failure recovery.

An example of another embodiment concerning utilizing interference measurements in beam recovery procedure, which can be referred to as item 116, is the method of item 113, wherein the signal quality based recovery threshold is set to as one of the following: explicitly value configured by network, $Q_{out,L,R}$ or $Q_{in,RLM}$ threshold for beam failure detection, $Q_{in\_IS}$ or $Q_{out}$ threshold of radio link monitoring (in block error ratio), and user equipment applies X percentage unit offset for candidate beam selection.

An example of another embodiment concerning utilizing interference measurements in beam recovery procedure, which can be referred to as item 117, is the method of item 113, further comprising in response to selecting contention free random access candidates based on reference signal received power: selecting one contention free random access candidate above the reference signal received power threshold; indicating the selection; and generating a beam failure recovery medium access control control element indicating up to N contention free random access candidates with lowest block error ratio/highest measure of signal quality, where the medium access control control element is transmitted in a radio resource control connection request.

An example of another embodiment concerning utilizing interference measurements in beam recovery procedure, which can be referred to as item 118, is the method of item 101, wherein in response to no contention free random access candidates being configured, the method further comprises: determining signal quality for N-highest synchronization signal reference signal received power above the synchronization signal physical broadcast channel block reference signal received power threshold; and selecting the candidate with highest signal quality.

An example of another embodiment concerning utilizing interference measurements in beam recovery procedure, which can be referred to as item 119, is the method of item 101, wherein the user equipment evaluates contention free random access candidates based on signal quality only when a beam failure recovery timer is running or has not been configured.

An example of another embodiment concerning utilizing interference measurements in beam recovery procedure, which can be referred to as item 120, is the method of item 101, wherein a random access procedure has been initiated for beam failure recovery.

An example of another embodiment concerning utilizing interference measurements in beam recovery procedure, which can be referred to as item 121, is the method of item 101, wherein contention free random access resources for beam failure recovery request being associated with any of the synchronization signal physical broadcast channel blocks and/or channel state information reference signals have been explicitly provided.

An example of another embodiment concerning utilizing interference measurements in beam recovery procedure, which can be referred to as item 122, is an apparatus comprising: at least one processor; and at least one memory including computer program code, wherein the at least one memory and the computer program code are configured, with the at least one processor, to cause the apparatus to perform at least the following: determining, by a user equipment in a wireless communications network, a measure of signal quality for a restricted set of beam recovery candidates; comparing the measure of signal quality of contention free random access candidates reference signal in the restricted set of beam recovery candidates or a subset of contention free random access candidates to a signal quality based recovery threshold; selecting the at least one candidate signal with signal quality above the signal quality based recovery threshold from a candidate beam reference signal list.

An example of another embodiment concerning utilizing interference measurements in beam recovery procedure, which can be referred to as item 123, is the apparatus of item 122, wherein the candidate beam reference signal list comprises: at least one synchronization signal physical broadcast channel block of a plurality of synchronization signal physical broadcast channel blocks; at least one channel state information reference signal of a plurality of channel state information reference signals; or at least one synchronization signal physical broadcast channel block of a plurality of synchronization signal physical broadcast channel blocks and at least one channel state information reference signal of a plurality of channel state information reference signals.

An example of another embodiment concerning utilizing interference measurements in beam recovery procedure, which can be referred to as item 124, is the apparatus of item 122, wherein the selecting further comprises: choosing from the at least one synchronization signal physical broadcast channel block or the at least one channel state information reference signal with highest reference signal received power.

An example of another embodiment concerning utilizing interference measurements in beam recovery procedure, which can be referred to as item 125, is the apparatus of item 122, wherein the measure of signal quality is based in a signal to interference noise ratio for a physical layer.

An example of another embodiment concerning utilizing interference measurements in beam recovery procedure, which can be referred to as item 126, is the apparatus of item 122, wherein the at least one memory and the computer program code are further configured, with the at least one processor, to cause the apparatus to further perform at least the following: in response to the at least one synchronization signal physical broadcast channel block additionally having an synchronization signal reference signal received power above a synchronization signal physical broadcast channel block reference signal received power threshold or the at least one channel state information reference signal additionally having a channel state information reference signal received power above a channel state information reference signal reference signal received power threshold, selecting the at least one synchronization signal physical broadcast channel block or the at least one channel state information reference signal from the candidate beam reference signal list.

An example of another embodiment concerning utilizing interference measurements in beam recovery procedure, which can be referred to as item 127, is the apparatus of item 122, wherein the at least one memory and the computer program code are further configured, with the at least one processor, to cause the apparatus to further perform at least the following: in response to no contention free random access candidate being above the signal quality based recovery threshold, basing recovery on contention based random access; and selecting candidates above a synchronization signal physical broadcast channel block reference signal received power threshold.

An example of another embodiment concerning utilizing interference measurements in beam recovery procedure, which can be referred to as item 128, is the apparatus of item 122, wherein the at least one memory and the computer program code are further configured, with the at least one processor, to cause the apparatus to further perform at least the following: in response to no contention free random access candidate being above the signal quality recovery threshold, selecting a candidate based on reference signal received power.

An example of another embodiment concerning utilizing interference measurements in beam recovery procedure, which can be referred to as item 129, is the apparatus of item 127, wherein the at least one memory and the computer program code are further configured, with the at least one processor, to cause the apparatus to further perform at least the following: releasing the contention free random access candidate resources upon successful completion of beam failure recovery.

An example of another embodiment concerning utilizing interference measurements in beam recovery procedure, which can be referred to as item 130, is the apparatus of item 122, wherein the determining is based on at least one of: the measure of signal quality being calculated for set of candidate beams that can be indicated using contention free random access preambles; or the user equipment being configured with signal quality measurements on subset of contention free random access candidates in set of candidate beams.

An example of another embodiment concerning utilizing interference measurements in beam recovery procedure, which can be referred to as item 131, is the apparatus of item 122, wherein the measure of signal quality is determined for channel state information reference signal candidates, synchronization signal physical broadcast channel block candidates, or for both channel state information reference signal and synchronization signal physical broadcast channel block candidates.

An example of another embodiment concerning utilizing interference measurements in beam recovery procedure, which can be referred to as item 132, is the apparatus of item 124, wherein determining the signal to interference noise ratio for a physical layer is replaced with determining a hypothetical physical downlink control channel block error ratio, wherein the threshold is configured in terms of block error ratio instead of the signal quality, wherein selecting the at least one synchronization signal physical broadcast channel block or the at least one channel state information reference signal from the candidate beam reference signal list is with block error ratio below a block error ratio threshold.

An example of another embodiment concerning utilizing interference measurements in beam recovery procedure, which can be referred to as item 133, is the apparatus of item 122, wherein the signal quality based recovery threshold is configured by the network.

An example of another embodiment concerning utilizing interference measurements in beam recovery procedure, which can be referred to as item 134, is an apparatus comprising: at least one processor; and at least one memory including computer program code, wherein the at least one memory and the computer program code are configured, with the at least one processor, to cause the apparatus to perform at least the following: measuring, by an user equipment in a wireless communications network, a reference signal received power for contention free random access candidate beams; selecting candidates above a reference signal received power threshold; determining signal quality for the selected contention free random access candidates above the reference signal received power threshold; in response to multiple contention free random access candidates being above the signal quality based recovery threshold, selecting one of the candidates, or selecting the candidate with highest measure of signal quality among candidates above a signal quality based recovery threshold.

An example of another embodiment concerning utilizing interference measurements in beam recovery procedure, which can be referred to as item 135, is the apparatus of item 134, wherein the at least one memory and the computer program code are further configured, with the at least one processor, to cause the apparatus to further perform at least the following: in response to no contention free random access candidate being above the signal quality recovery threshold, selects the contention free random access candidates above the reference signal received power threshold.

An example of another embodiment concerning utilizing interference measurements in beam recovery procedure, which can be referred to as item 136, is the apparatus of item 134, wherein the at least one memory and the computer program code are further configured, with the at least one processor, to cause the apparatus to further perform at least the following: in response to no contention free random access candidate being above the signal quality recovery threshold; selecting candidate based on reference signal received power; releasing the contention free random access candidate resources upon successful completion of beam failure recovery.

An example of another embodiment concerning utilizing interference measurements in beam recovery procedure, which can be referred to as item 137, is the apparatus of item 134, wherein the signal quality based recovery threshold is set to as one of the following: explicitly value configured by network, $Q_{out,L,R}$ or $Q_{in,\ RLM}$ threshold for beam failure detection, $Q_{in\ IS}$ or $Q_{out}$ threshold of radio link monitoring (in block error ratio), and user equipment applies X percentage unit offset for candidate beam selection.

An example of another embodiment concerning utilizing interference measurements in beam recovery procedure, which can be referred to as item 138, is the apparatus of item 134, wherein the at least one memory and the computer program code are further configured, with the at least one processor, to cause the apparatus to further perform at least the following in response to selecting contention free random access candidates based on reference signal received power: selecting one contention free random access candidate above the reference signal received power threshold; indicating the selection; and generating a beam failure recovery medium access control control element indicating up to N contention free random access candidates with lowest block error ratio/highest measure of signal quality, where the medium access control control element is transmitted in a radio resource control connection request.

An example of another embodiment concerning utilizing interference measurements in beam recovery procedure, which can be referred to as item 139, is the apparatus of item 122, wherein in response to no contention free random access candidates being configured, the method further comprises: determining signal quality for N-highest synchronization signal reference signal received power above the synchronization signal physical broadcast channel block reference signal received power threshold; and selecting the candidate with highest signal quality.

An example of another embodiment concerning utilizing interference measurements in beam recovery procedure, which can be referred to as item 140, is the apparatus of item 122, wherein the user equipment evaluates contention free random access candidates based on signal quality only when a beam failure recovery timer is running or has not been configured.

An example of another embodiment concerning utilizing interference measurements in beam recovery procedure, which can be referred to as item 141, is the apparatus of item 122, wherein a random access procedure has been initiated for beam failure recovery.

An example of another embodiment concerning utilizing interference measurements in beam recovery procedure, which can be referred to as item 142, is the apparatus of item 122, wherein contention free random access resources for beam failure recovery request being associated with any of the synchronization signal physical broadcast channel blocks and/or channel state information reference signals have been explicitly provided.

An example of another embodiment concerning utilizing interference measurements in beam recovery procedure, which can be referred to as item 143, is an apparatus comprising: means for determining, by a user equipment in a wireless communications network, a measure of signal quality for a restricted set of beam recovery candidates; means for comparing the measure of signal quality of contention free random access candidates reference signal in the restricted set of beam recovery candidates or a subset of contention free random access candidates to a signal quality based recovery threshold; means for selecting the at least one candidate signal with signal quality above the signal quality based recovery threshold from a candidate beam reference signal list.

An example of another embodiment concerning utilizing interference measurements in beam recovery procedure, which can be referred to as item 144, is an apparatus comprising: means for measuring, by an user equipment in a wireless communications network, a reference signal received power for contention free random access candidate beams; means for selecting candidates above a reference signal received power threshold; means for determining signal quality for the selected contention free random access candidates above the reference signal received power threshold; in response to multiple contention free random access candidates being above the signal quality based recovery threshold, means for selecting one of the candidates, or means for selecting the candidate with highest measure of signal quality among candidates above a signal quality based recovery threshold.

An example of another embodiment concerning utilizing interference measurements in beam recovery procedure, which can be referred to as item 145, is a computer program comprising: code for determining, by a user equipment in a wireless communications network, a measure of signal quality for a restricted set of beam recovery candidates; code for comparing the measure of signal quality of contention free random access candidates reference signal in the restricted set of beam recovery candidates or a subset of contention free random access candidates to a signal quality based recovery threshold; code for selecting the at least one candidate signal with signal quality above the signal quality based recovery threshold from a candidate beam reference signal list.

An example of another embodiment concerning utilizing interference measurements in beam recovery procedure, which can be referred to as item 146, is a computer program comprising: code for measuring, by an user equipment in a wireless communications network, a reference signal received power for contention free random access candidate beams; code for selecting candidates above a reference signal received power threshold; code for determining signal quality for the selected contention free random access candidates above the reference signal received power threshold; in response to multiple contention free random access candidates being above the signal quality based recovery threshold, code for selecting one of the candidates, or code for selecting the candidate with highest measure of signal quality among candidates above a signal quality based recovery threshold.

An example of another embodiment concerning utilizing interference measurements in beam recovery procedure, which can be referred to as item 147, is a computer program product comprising a computer-readable medium bearing the computer program of item 143 embodied therein for use with a computer.

An example of another embodiment concerning utilizing interference measurements in beam recovery procedure, which can be referred to as item 148. A computer program product comprising a computer-readable medium bearing the computer program of item 144 embodied therein for use with a computer.

An example of another embodiment concerning utilizing interference measurements in beam recovery procedure, which can be referred to as item 149, is a computer program product comprising a computer-readable medium bearing the computer program code embodied therein for use with a computer, the computer program code comprising code to control or perform at least the following: determining, by a user equipment in a wireless communications network, a measure of signal quality for a restricted set of beam recovery candidates; comparing the measure of signal quality of contention free random access candidates reference signal in the restricted set of beam recovery candidates or a subset of contention free random access candidates to a signal quality based recovery threshold; selecting the at least one candidate signal with signal quality above the signal quality based recovery threshold from a candidate beam reference signal list.

An example of another embodiment concerning utilizing interference measurements in beam recovery procedure, which can be referred to as item 150, is a computer program product comprising a computer-readable medium bearing the computer program code embodied therein for use with a computer, the computer program code comprising code to control or perform at least the following: measuring, by an user equipment in a wireless communications network, a reference signal received power for contention free random access candidate beams; selecting candidates above a reference signal received power threshold; determining signal quality for the selected contention free random access candidates above the reference signal received power threshold; selecting, in response to multiple contention free random access candidates being above the signal quality based recovery threshold, selecting one of the candidates, or selecting the candidate with highest measure of signal quality among candidates above a signal quality based recovery threshold.

If desired, the different functions discussed herein regarding utilizing interference measurements in beam recovery procedure may be performed in a different order and/or concurrently with each other. Furthermore, if desired, one or more of the above-described functions may be optional or may be combined.

Although various aspects of the invention regarding utilizing interference measurements in beam recovery procedure are set out in the independent claims, other aspects of the invention comprise other combinations of features from the described embodiments and/or the dependent claims with the features of the independent claims, and not solely the combinations explicitly set out in the claims.

It is also noted herein that while the above describes exemplary embodiments of the invention regarding utilizing interference measurements in beam recovery procedure, these descriptions should not be viewed in a limiting sense. Rather, there are several variations and modifications which may be made without departing from the scope of the present invention regarding utilizing interference measurements in beam recovery procedure as defined in the appended claims.

The invention claimed is:

1. A method comprising:
   measuring, by an user equipment in a wireless communications network, a reference signal received power for contention free random access candidate beams;
   selecting candidates above a reference signal received power threshold, among the contention free random access candidate beams;
   determining signal quality for the selected contention free random access candidate beams above the reference signal received power threshold; and
   in response to multiple contention free random access candidate beams being above a signal quality based recovery threshold,
      selecting a beam which has the signal quality above the signal quality based recovery threshold among the multiple contention free random access candidate beams.

2. The method of claim 1, further comprising:
   in response to no contention free random access candidate being above the signal quality recovery threshold, selects the contention free random access candidates above the reference signal received power threshold.

3. The method of claim 1, further comprising:
   in response to no contention free random access candidate being above the signal quality recovery threshold;
   selecting candidate based on reference signal received power; and
   releasing the contention free random access candidate resources upon successful completion of beam failure recovery.

4. The method of claim 1, wherein the signal quality based recovery threshold is set to as one of the following:
   explicitly value configured by network,
   $Q_{out,L,R}$ or $Q_{in,RLM}$ threshold for beam failure detection, or
   $Q_{in\_IS}$ or $Q_{out}$ threshold of radio link monitoring (in block error ratio), and user equipment applies X percentage unit offset for candidate beam selection.

5. The method of claim 1, further comprising in response to selecting contention free random access candidates based on reference signal received power:
   selecting one contention free random access candidate above the reference signal received power threshold;
   indicating the selection; and
   generating a beam failure recovery medium access control (BFR MAC) control element (CE) indicating up to N contention free random access candidates with lowest block error ratio/highest measure of signal quality, where the BFR MAC CE is transmitted in a radio resource control connection request.

6. An apparatus comprising:
   at least one processor; and
   at least one memory including computer program code, wherein the at least one memory and the computer program code are configured, with the at least one processor, to cause the apparatus to perform at least the following:
   measuring, by an user equipment in a wireless communications network, a reference signal received power for contention free random access candidate beams;
   selecting candidates among the contention free random access candidate beams above a reference signal received power threshold;
   determining signal quality for the selected contention free random access candidate beams above the reference signal received power threshold; and
   in response to multiple contention free random access candidate beams being above a signal quality based recovery threshold,
      selecting a beam which has the signal quality among the multiple contention free random access candidate beams above the signal quality based recovery threshold.

7. The apparatus of claim 6, wherein the at least one memory and the computer program code are further configured, with the at least one processor, to cause the apparatus to further perform at least the following:

in response to no contention free random access candidate being above the signal quality recovery threshold, selects the contention free random access candidates above the reference signal received power threshold.

8. The apparatus of claim 6, wherein the at least one memory and the computer program code are further configured, with the at least one processor, to cause the apparatus to further perform at least the following:

in response to no contention free random access candidate being above the signal quality recovery threshold;

selecting candidate based on reference signal received power; and releasing the contention free random access candidate resources upon successful completion of beam failure recovery.

9. The apparatus of claim 6, wherein the signal quality based recovery threshold is set to as one of the following:

explicitly value configured by network, $Q_{out,LR}$ or $Q_{in,RLM}$ threshold for beam failure detection, or $Q_{in\_IS}$ or $Q_{out}$ threshold of radio link monitoring (in block error ratio), and user equipment applies X percentage unit offset for candidate beam selection.

10. The apparatus of claim 6, wherein the at least one memory and the computer program code are further configured, with the at least one processor, to cause the apparatus to further perform at least the following in response to selecting contention free random access candidates based on reference signal received power:

selecting one contention free random access candidate above the reference signal received power threshold;

indicating the selection; and generating a beam failure recovery medium access control (BFR MAC) control element (CE) indicating up to N contention free random access candidates with lowest block error ratio/highest measure of signal quality, where the BFR MAC CE is transmitted in a radio resource control connection request.

11. A computer program product comprising a non-transitory computer-readable medium bearing the computer program code embodied therein for use with a computer, the computer program code comprising code to control or perform at least the following:

measuring, by an user equipment in a wireless communications network, a reference signal received power for contention free random access candidate beams;

selecting candidates above a reference signal received power threshold, among the contention free random access candidate beams;

determining signal quality for the selected contention free random access candidate beams above the reference signal received power threshold; and in response to multiple contention free random access candidate beams being above a signal quality based recovery threshold, selecting a beam which has the signal quality above the signal quality based recovery threshold among the multiple contention free random access candidate beams.

12. The computer program product of claim 11, wherein the computer program code is configured to:

in response to no contention free random access candidate being above the signal quality recovery threshold, select the contention free random access candidates above the reference signal received power threshold.

13. The computer program product of claim 11, wherein the computer program code is configured to:

in response to no contention free random access candidate being above the signal quality recovery threshold;

select candidate based on reference signal received power; and release the contention free random access candidate resources upon successful completion of beam failure recovery.

14. The computer program product of claim 11, wherein the signal quality based recovery threshold is set to as one of the following:

explicitly value configured by network, $Q_{out,LR}$ or $Q_{in,RLM}$ threshold for beam failure detection, or $Q_{in\_IS}$ or $Q_{out}$ threshold of radio link monitoring (in block error ratio), and user equipment applies X percentage unit offset for candidate beam selection.

15. The computer program product of claim 11, wherein the computer program code is configured to:

in response to selecting contention free random access candidates based on reference signal received power:

select one contention free random access candidate above the reference signal received power threshold;

indicate the selection; and generate a beam failure recovery medium access control element (BFR MAC CE) indicating up to N contention free random access candidates with lowest block error ratio/highest measure of signal quality, where the BFR MAC CE is transmitted in a radio resource control connection request.

* * * * *